US011010634B2

(12) United States Patent
Takahashi et al.

(10) Patent No.: US 11,010,634 B2
(45) Date of Patent: May 18, 2021

(54) MEASUREMENT APPARATUS, MEASUREMENT METHOD, AND COMPUTER-READABLE RECORDING MEDIUM STORING MEASUREMENT PROGRAM

(71) Applicant: FUJITSU LIMITED, Kawasaki (JP)

(72) Inventors: Fumiyuki Takahashi, Atsugi (JP); Tetsuo Koezuka, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 16/505,113

(22) Filed: Jul. 8, 2019

(65) Prior Publication Data

US 2020/0034650 A1 Jan. 30, 2020

(30) Foreign Application Priority Data

Jul. 26, 2018 (JP) .............................. JP2018-139988

(51) Int. Cl.
*G06K 9/00* (2006.01)
*G06K 9/62* (2006.01)
*G06K 9/46* (2006.01)

(52) U.S. Cl.
CPC ....... *G06K 9/6203* (2013.01); *G06K 9/00208* (2013.01); *G06K 9/4604* (2013.01); *G06K 9/6215* (2013.01)

(58) Field of Classification Search
CPC ............. G06K 9/6203; G06K 9/00208; G06K 9/4604; G06K 9/52; G06K 9/6201;
(Continued)

(56) References Cited

U.S. PATENT DOCUMENTS

2010/0232683 A1* 9/2010 Fujieda ................... G06T 15/20
382/154
2012/0141011 A1 6/2012 Sakai et al.
(Continued)

FOREIGN PATENT DOCUMENTS

JP 2010-283004 12/2010
JP 2016-38790 3/2016
JP 2017-91078 5/2017

*Primary Examiner* — Jose L Couso
(74) *Attorney, Agent, or Firm* — Staas & Halsey LLP

(57) ABSTRACT

An apparatus includes a processor that matches of local-feature-amounts in a state where an image of a measurement target captured by an image-sensor and a projective-transformed image of three-dimensional design data of the measurement target substantially overlap each other on a display to search the captured image and a virtual image generated from the projective-transformed image for a plurality of feature-point pairs with similar local-feature-amounts of an image, estimates a temporary-external-parameter related to a position and orientation of the image-sensor, compares an initial-external-parameter and the temporary-external-parameter to diagnose reliability of the temporary-external-parameter, and selects, among the feature-point pairs, a specified number of feature-point pairs with a score value indicating similarity between two feature-points forming each feature-point pair equal to or higher than a threshold value, estimate a final-external-parameter using the selected feature-point pairs, and display the captured image and the projective-transformed image in a superimposing manner using the external-parameter.

20 Claims, 24 Drawing Sheets

(58) Field of Classification Search
CPC .............. G06K 9/6202; G06K 9/6255; G06K 9/00563; G06K 9/036; G06K 9/2063; G06K 9/3216; G06K 9/3233; G06K 9/4671; G06K 9/6211; G06K 9/6215; G06K 9/6271; G06K 2009/3225; G06K 2009/4666; G06K 2209/19; G06K 2209/403; G06T 2200/24; G06T 2219/2016; G06T 2207/10056; G06T 2207/30148; G06T 2207/10004; G06T 2207/10016; G06T 2207/20101; G06T 2207/30244; G06T 2207/20212; G06T 2207/30164; G06T 2207/30204; G06T 2207/30108; G06T 2207/30141; G06T 2207/30152; G06T 3/20; G06T 3/40; G06T 3/60; G06T 5/50; G06T 7/001; G06T 7/0004; G06T 7/0006; G06T 7/30; G06T 7/73; G06T 7/74; G06T 7/75; G06T 7/248; G06T 7/344; G06T 7/80; G06T 7/0002; G06T 7/0008; G06T 7/337; G06T 7/60; G06T 7/62; G06T 7/11; G06T 7/12; G06T 7/70; G06T 7/246; G06T 15/00; G06T 17/00; G06T 17/20; G06T 19/006; G06T 19/00; G06T 19/20; G01B 11/25; G01B 11/2518; G01B 11/30; G01B 11/02; G01B 5/008; G01B 21/04; G01N 21/9501; G01N 2201/102; H04N 5/2258; H01L 22/12; H01L 22/20; H01L 22/10; G05B 19/4097; G06F 2119/18; G06F 30/39; G06F 30/398; G06F 2111/04; G06F 3/04812; G06F 3/04815; G06F 3/04845; G06F 3/04847; G06F 3/048; G01C 11/06; G01C 3/085; B22F 3/1055; B22F 2003/1057; H05K 13/0015; Y10T 29/49002; B33Y 10/00; B33Y 30/00; B33Y 50/02; A61B 5/065; A61B 5/1076; A61B 1/00147; A61B 1/00183; A61B 1/01; B29C 64/393

See application file for complete search history.

(56) References Cited

U.S. PATENT DOCUMENTS

| | | | | |
|---|---|---|---|---|
| 2012/0269388 | A1* | 10/2012 | Jiang | G01C 15/00 382/103 |
| 2013/0245828 | A1* | 9/2013 | Tateno | G06T 7/75 700/259 |
| 2014/0098091 | A1* | 4/2014 | Hori | G06T 19/20 345/419 |
| 2014/0176530 | A1* | 6/2014 | Pathre | G06T 19/20 345/419 |
| 2017/0132752 | A1 | 5/2017 | Aoyagi et al. | |
| 2019/0228263 | A1* | 7/2019 | Szeto | B25J 9/1697 |

* cited by examiner

FIG. 24

| NUMBER OF LOOPS | FEATURE POINT PAIR SELECTED IN STEP S702 | DETERMINATION VALUE fitness | ACCUMULATOR VALUE ||||||||||| 
|---|---|---|---|---|---|---|---|---|---|---|---|---|---|
| | | | 1 | 2 | 3 | 4 | 5 | 6 | 7 | 8 | 9 | 10 | 11 |
| 1 | [1, 4, 5, 6, 10] | 0.62 | 1 | 0 | 0 | 1 | 1 | 0 | 1 | 0 | 0 | 1 | 0 |
| 2 | [3, 5, 6, 7, 11] | 0.59 | 1 | 0 | 1 | 1 | 2 | 1 | 2 | 0 | 0 | 0 | 1 |
| 3 | [1, 4, 5, 9, 10] | 0.02 | 1 | 0 | 1 | 1 | 2 | 1 | 2 | 0 | 0 | 0 | 1 |
| 4 | [2, 7, 8, 10, 11] | 0.38 | 1 | 1 | 1 | 1 | 2 | 1 | 2 | 1 | 0 | 1 | 2 |
| ... | ... | ... | ... | ... | ... | ... | ... | ... | ... | ... | ... | ... | ... |
| | | | 62 | 24 | 41 | 60 | 62 | 52 | 60 | 42 | 0 | 42 | 57 |

⇧ FINAL ACCUMULATOR VALUE

MEASUREMENT APPARATUS, MEASUREMENT METHOD, AND COMPUTER-READABLE RECORDING MEDIUM STORING MEASUREMENT PROGRAM

CROSS-REFERENCE TO RELATED APPLICATION

This application is based upon and claims the benefit of priority of the prior Japanese Patent Application No. 2018-139988, filed on Jul. 26, 2018, the entire contents of which are incorporated herein by reference.

FIELD

The embodiments discussed herein are related to a measurement apparatus, a measurement method, and a computer-readable recording medium storing a measurement program.

BACKGROUND

For example, in the field of manufacturing, a work of checking whether or not a product as an example of a measurement target is manufactured according to a design drawing is performed for quality control. However, it is not easy to check whether or not a complex three-dimensional object is manufactured according to the design drawing.

For example, a three-dimensional measuring machine may be used to measure a three-dimensional shape of the product. However, since the three-dimensional measuring machine is relatively large, it is difficult to be used at a manufacturing site, and a size of the measurable product is limited. It takes time to perform measurement with the three-dimensional measuring machine. The three-dimensional measuring machine is relatively expensive. For these reasons, a method of measuring a three-dimensional shape of a product using the three-dimensional measuring machine is not very practical.

Therefore, a method of drawing design data such as a design drawing of a product superimposed on a captured image of the product in a manner by applying an augmented reality (AR) technology has been proposed (for example, Japanese Laid-open Patent Publication No. 2017-091078). In this proposed method, an image drawn by superimposing product design data by a three-dimensional computer-aided design (3D-CAD) on a captured image of the product captured using a camera at a manufacturing site is displayed. Accordingly, it becomes easy to detect the difference between the product and the design drawing.

In order to draw an image by superimposing design data of a product on a captured image of the product, it is required to know the position and orientation of the camera with respect to the product when capturing an image of the product. The position and orientation of a camera with respect to the product may be estimated using information indicating which part of a plurality of features (for example, dots and lines) of the product in the captured image correspond to which part of the design data.

However, for the correspondence information between the design data and the captured image of the product, a user manually teaches features such as points (or lines) on a captured image and features such as similarity points (or similarity lines) on the design data on a graphical user interface (GUI). Such manual teaching work takes time and effort. Since teaching accuracy varies according to the skill (or skill level) of the user who teaches the correspondence information between the design data and the captured image of the product, the superposition accuracy when superimposing and drawing the design data of a product on a captured image of the product depends on the skill of the user.

Japanese Laid-open Patent Publication No. 2010-283004 and Japanese Laid-open Patent Publication No. 2016-038790 are examples of related art.

SUMMARY

According to an aspect of the embodiments, a measurement apparatus includes a memory; and a processor coupled to the memory and the processor that matches local feature amounts between an image of a measurement target captured by an image sensor and a projective-transformed image of three-dimensional design data of the measurement target in a state where the images overlap each other on a display screen to search the captured image and a virtual image generated from the projective-transformed image for a plurality of feature point pairs with similar local feature amounts of the images; estimates a temporary external parameter related to a position and orientation of the image sensor with respect to the measurement target from a feature point pair randomly selected from the plurality of searched feature point pairs; compares an initial external parameter and the temporary external parameter to diagnose reliability of the temporary external parameter and to record a feature point pair used to calculate a temporary external parameter with the reliability equal to or higher than a given value; and selects, among the feature point pairs, a specified number of feature point pairs with a score value indicating similarity between two feature points forming each feature point pair equal to or higher than a threshold value, estimates an external parameter using the selected feature point pairs, and displays the captured image and the projective-transformed image in a superimposing manner using the external parameter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 24 is a table for explaining an example of the number of loops of a process, a selected feature point pair, a determination value fitness, and accumulator values.

DESCRIPTION OF EMBODIMENTS

In the measurement method of related art, since a user manually teaches correspondence information, it is difficult to improve superposition accuracy when drawing design data of a measurement target superimposed on a captured image of the measurement target.

In the disclosed measurement apparatus, measurement method, and measurement program, in a state where a captured image of a measurement target and a projective-transformed image of three-dimensional design data of the measurement target substantially overlap each other on a display screen, a plurality of feature point pairs having similar local feature amounts of the image are searched from the captured image and a virtual image (sometimes called generated image) generated from the projective-transformed image using matching of local feature amounts. Temporary external parameters are estimated from feature point pairs randomly selected from the plurality of searched feature point pairs. Reliability of the temporary external parameters is diagnosed by comparing initial external parameters and the temporary external parameters, and feature point pairs used to calculate the temporary external parameters with reliability equal to or higher than a given value are recorded. Among the reliable feature point pairs, a specified number of feature point pairs with a score value indicating similarity between two feature points forming each feature point pair equal to or higher than a threshold value are selected, and the selected feature point pairs are used to estimate a final external parameter. The captured image and the projective-transformed image are displayed in a superimposing manner using the final external parameter.

Hereinafter, embodiments of the disclosed measurement apparatus, measurement method, and measurement program will be described with reference to the drawings.

EMBODIMENTS

Figure 1:
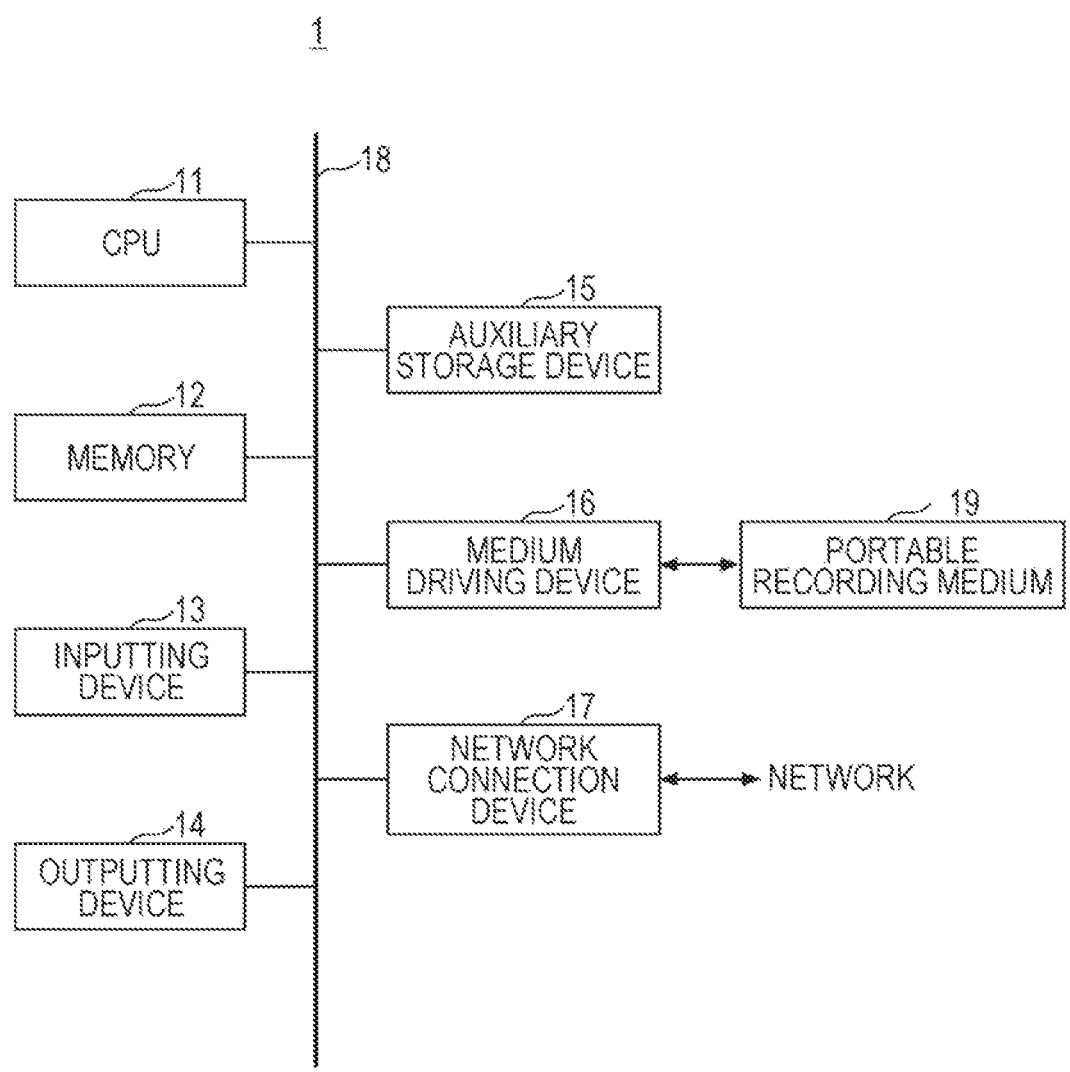
FIG. 1 is a block diagram illustrating an example of a hardware configuration of a computer capable of forming a measurement apparatus.

FIG. 1 is a block diagram illustrating an example of a hardware configuration of a computer capable of forming a measurement apparatus. A computer 1 illustrated in FIG. 1 includes a central processing unit (CPU) 11, a memory 12, an inputting device 13, an outputting device 14, an auxiliary storage device 15, a medium driving device 16, and a network connection device 17 connected to one another by a bus 18. The computer 1 is an example of an information processing device.

The memory 12 may be formed of a semiconductor memory such as a read only memory (ROM), a random access memory (RAM), a flash memory, and stores various programs including a measurement program used by the CPU 11, various data, and the like.

The CPU 11 is an example of a processor and executes a program such as a measurement program stored in the memory 12 to execute various process such as a measurement process described later. The CPU 11 may be a single CPU, a multi-CPU, or a multi-core CPU.

The inputting device 13 may be formed of a keyboard, a pointing device such as a mouse, and the like, and may be used to input instruction from a user, information, and the like. The user includes an operator, a worker, and the like who may operate the computer 1 forming the measurement apparatus.

The outputting device 14 may be formed of, for example, a display device and the like, and may be used to output a message to a user, an intermediate result of the measurement process, a process result, and the like.

The inputting device 13 and the outputting device 14 may be formed of, for example, a touch panel provided with functions of both a keyboard and a display device. The inputting device 13 may be a combination of a keyboard and a pointing device.

The auxiliary storage device 15 may be formed of, for example, a magnetic disk device, an optical disk device, a magneto-optical disk device, a magnetic tape device, a semiconductor memory, or the like. The auxiliary storage device 15 stores various programs including the measurement program used by the CPU 11, various data, and the like. The user may load the program, data, and the like stored in the auxiliary storage device 15 into the memory 12 for use.

The medium driving device 16 drives a loaded portable recording medium 19 and is accessible to the portable recording medium 19. The portable recording medium 19 may be formed of, for example, a magnetic disk, an optical disk, a magneto-optical disk, a semiconductor memory, or the like. The portable recording medium 19 may be formed of a compact disk read only memory (CD-ROM), a digital versatile disk (DVD), a Universal Serial Bus (USB)

memory, or the like. The user may record a program, data, and the like in the portable recording medium 19 and load them into the memory 12 for use.

A computer-readable recording medium for storing a program, data, and the like for a measurement process may be formed of a physical (non-temporary) recording medium such as the memory 12, the auxiliary storage device 15, and the portable recording medium 19.

The network connection device 17 is an example of communication interface which is connected to a communication network such as local area network (LAN) or wide area network (WAN) and performs data conversion accompanying communication. The computer 1 may receive programs, data, and the like from an external device connectable to a communication network via the network connection device 17 and load them into the memory 12 for use.

The computer 1 may have a configuration in which some of the components illustrated in FIG. 1 are omitted according to the application of the computer, the use conditions, and the like. For example, when the computer 1 may not be communicated with the external device, the network connection device 17 may be omitted, and when the portable recording medium 19 is not used, the medium driving device 16 may be omitted.

The computer 1 may have a configuration in which the inputting device 13 and the outputting device 14 are externally connected to the computer 1. The computer 1 may have, for example, a configuration in which the medium driving device 16 is externally connected to the computer 1.

For example, when the computer 1 is a portable terminal device with a communication function, the inputting device 13 includes a microphone which is an example of a device for communication, and the outputting device 14 includes a speaker as a device for communication. The inputting device 13 may include an image capturing device including an image sensor.

Figure 2:
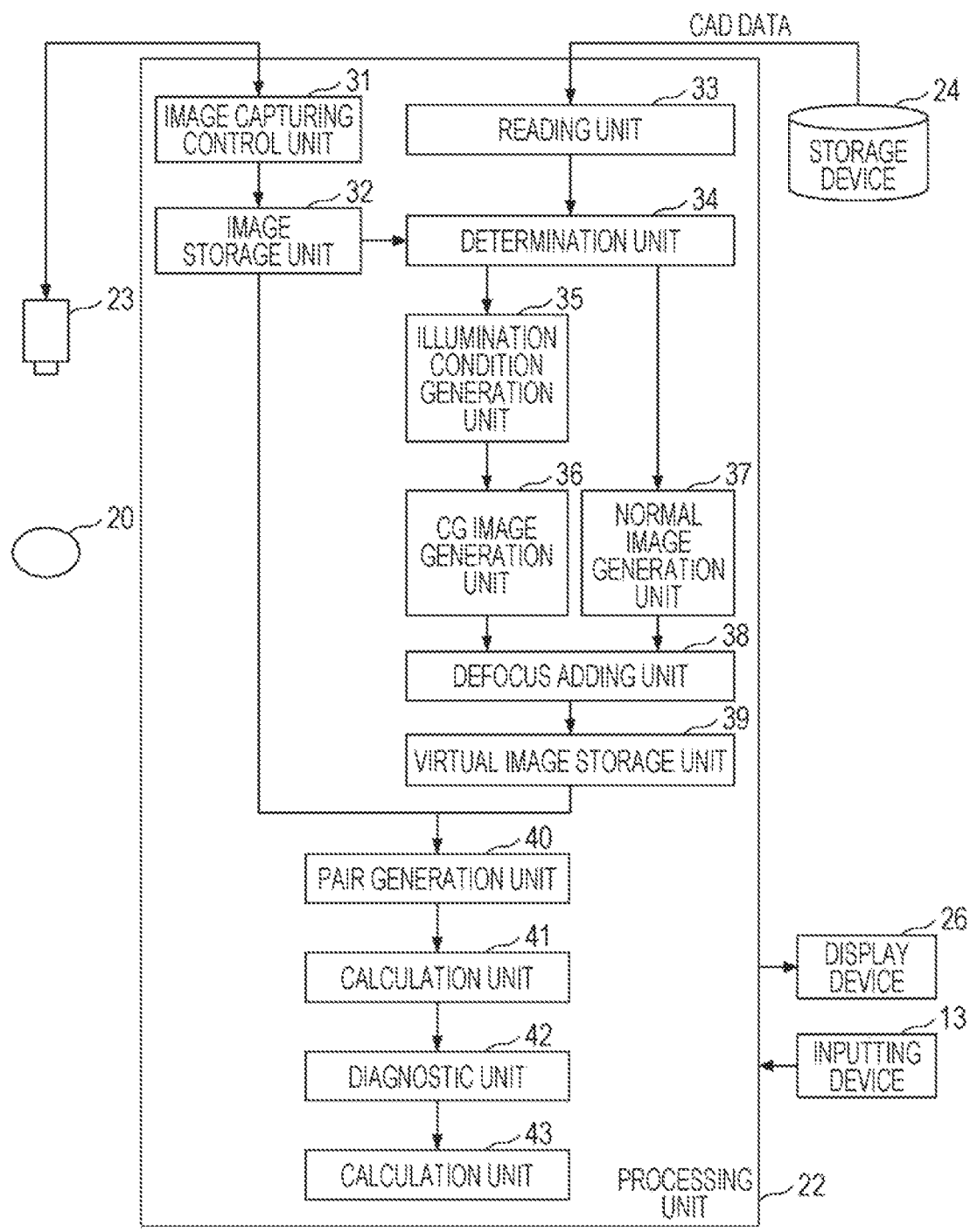
FIG. 2 is a block diagram illustrating an example of a functional configuration of the measurement apparatus.

FIG. 2 is a block diagram illustrating an example of a functional configuration of the measurement apparatus. A measurement apparatus 21 illustrated in FIG. 2 may include at least a processing unit 22. Each function of the processing unit 22 may be realized by the CPU 11 of the computer 1 illustrated in FIG. 1.

A camera 23 which is an example of an image capturing device including an image sensor, a storage device 24, the inputting device 13, and a display device 26 which is an example of the outputting device 14 may all form a part of the measurement apparatus 21 or may be externally connected to the measurement apparatus 21. The camera 23 captures an image of a product 20 which is an example of a measurement target in this example. The product 20 is an actual part, a product, or the like manufactured based on the design data of the product 20. The storage device 24 may be formed of, for example, at least one of the memory 12, the auxiliary storage device 15, and the medium driving device 16 loaded with the portable recording medium 19 illustrated in FIG. 1. The storage device 24 may be a storage device externally connected to the measurement apparatus 21.

The processing unit 22 includes an image capturing control unit 31, an image storage unit 32, a reading unit 33 that reads CAD data, a determination unit 34 that determines the initial external parameters, and an illumination condition generation unit 35. The processing unit 22 includes a computer graphic (CG) image generation unit (hereinafter referred to as "CG image generation unit") 36, a normal image generation unit 37, a defocus adding unit 38, and a virtual image storage unit 39. The processing unit 22 further includes a pair generation unit 40, a calculation unit 41 that calculates temporary external parameters, a diagnostic unit 42 that diagnoses temporary external parameters, and a calculation unit 43 that calculates final external parameters.

The image capturing control unit 31 controls image capturing of the camera 23. In this example, the image capturing control unit 31 controls the image capturing operation of the camera 23 so as to capture an image of the product 20. When the camera 23 is mounted on, for example, a robot, the image capturing control unit 31 may cause the camera 23 to capture an image of the product 20 by controlling the robot. When the camera 23 is mounted on, for example, a portable terminal device, the image capturing control unit 31 may display the range, procedure, and the like for capturing an image of the product 20 on the display device of the portable terminal device to prompt the user to capture an image of the product 20 with the camera 23.

The image storage unit 32 temporarily saves, for example, a captured image captured by the camera 23 in the storage device 24 such as the memory 12. The reading unit 33 reads, for example, design data which is an example of CAD data of the product 20 from the storage device 24 such as the memory 12. The format of design data is not particularly limited. In this example, the design data is three-dimensional design data in a format in which the determination unit 34 may draw a two-dimensional image which is a projection converted image on a display screen of the display device 26.

The determination unit 34 uses a captured image (hereinafter referred to as "captured image of the product 20") including the product 20 and the read design data and to draw the design data of the product 20 on the display screen of the display device 26 simultaneously displaying the captured image of the product 20 on the display screen of the display device 26. In this example, the design data of the product 20 drawn on the display screen is a projective-transformed image of three-dimensional design data of the product 20. The captured image of the product 20 and the drawn design data of the product 20 may be displayed at an overlapping position of on the display screen of the display device 26 or may be displayed at a non-overlapping position.

The user operates the inputting device 13 on the display screen of the display device 26 such that the captured image of the product 20 and the drawn design data of the product 20 substantially overlap each other. For example, the user adjusts the position, orientation, and scale of at least one of the captured image of the product 20 and the drawn design data of the product 20 using the inputting device 13 on the graphical user interface (GUI) by a known method on the display screen of the display device 26. The adjustment may be performed by an operation such as drag and drop of a cursor by, the inputting device 13. Accordingly, the captured image of the product 20 and the drawn design data of the product 20 substantially overlap each other on the display screen of the display device 26.

The determination unit 34 calculates an initial external parameter $E_0$ and saves it in the storage device 24 such as the memory 12. For example, the determination unit 34 saves an external parameter used to draw design data at the time point that the captured image of the product 20 and the drawn design data of the product 20 are adjusted to substantially overlap each other on the display screen of the display device 26 as the initial external parameter $E_0$ in the storage device 24 such as the memory 12.

Information on the position and orientation of the camera 23 (for example, position and orientation of the camera 23 in the world coordinate system) with respect to the product 20 is generally referred to as an external parameter of the camera 23. Information on an image capturing system of the camera 23 such as a focal length of the image capturing system such as a lens, an optical center, a size of the captured image is generally referred to as an internal parameter of the camera 23. When the internal parameter of the camera 23 is known, it is possible to calculate which three-dimensional coordinate on the design data is projective transformed (for example, mapping) to which coordinate of the captured image by estimating the external parameter of the camera 23.

The CG image generation unit 36 generates a CG image by a known method using the saved initial external parameter $E_0$. The CG image may be generated by rendering using a known CG library such as Open Graphics Library (OpenGL: registered trade mark) or DirectX (registered trade mark), or may be generated by performing rendering using a known ray tracing simulation. The CG images differ greatly in the generated images depending on the position of illumination. However, it is difficult to accurately reflect the illumination condition at the time of capturing an image as the condition for CG image generation. In this example, the illumination condition generation unit 35 generates a plurality of illumination conditions in advance, and the CG image generation unit 36 generates a plurality of CG images according to these plurality of illumination conditions. For example, the CG image generation unit 36 generates one CG image according to each illumination condition. The CG image generation unit 36 may include a depth image generation unit since the distance from the camera 23 to the product 20 may be obtained by a known method when generating a CG image by a known method. A depth image is an image indicating the distance from the camera 23 to all objects within a field of view including the product 20.

The normal image generation unit 37 generates a normal image by a known method using the saved initial external parameter $E_0$. The normal image is an image obtained by, for example, changing the color according to a normal direction (orientation of the surface) of a surface constituting the design data. Since the normal image does not depend on the illumination condition, it is suitable for performing a search for a feature point such as a stable corner which is not influenced by illumination in a corresponding point search to be described later.

In the present specification, CG images, depth images, and normal images are also collectively referred to as virtual images. The virtual images generated by the CG image generation unit 36 and the normal image generation unit 37 are supplied to the defocus adding unit 38. The defocus adding unit 38 newly generates a virtual image in which the defocus amount is changed based on each virtual image. In order to add defocus to the virtual image, an image process such as Gaussian filter may be applied to the original virtual image. When the defocus amount at the time of capturing an image is known in advance, only the image to which the defocus amount at the time of capturing the image is added may be generated. The virtual image storage unit 39 temporarily saves the virtual image generated by the defocus adding unit 38, for example, in the storage device 24 such as the memory 12.

The pair generation unit 40 searches the captured image saved in the image storage unit 32 and each virtual image generated by the above-described procedure for feature point pairs with similar local feature amounts of the image. By searching for a feature point pair, it is possible to search for coordinates of a feature point pair, which is a coordinate pair. As a method of searching for a feature point pair, known methods such as local feature amount matching such as scale-invariant feature transform (SIFT), speeded-up robust features (SURF), and oriented features from accelerated segment test (FAST) and rotated binary robust independent elementary features (BRIEF) (ORB) and template matching may be used. When a virtual image in which the defocus amount is changed is used, matching may be performed in the consideration of the defocus amount included in the captured image when the image of the product 20 is captured by the camera 23.

The calculation unit 41 calculates a temporary external parameter $E_1$ using a plurality of searched feature point pairs. The calculation unit 41 may randomly select, for example, N number (for example, N≥4) of feature point pairs from the plurality of searched feature point pairs and estimate the temporary external parameter $E_1$ by solving the perspective n-point (PnP) problem. For example, at a certain selected feature point pair, it is assumed that the captured image side is $(x^i_n, y^i_n)$ and the virtual image side is $(x^j_n, y^j_n)$. Here, n is 1, ..., N. The PnP problem is a problem of finding an external parameter when internal parameters are known and design coordinate values of four or more points in the captured image are known. In order to solve the PnP problem, for example, the efficient PnP (EPnP) method may be used. In order to estimate the temporary external parameter $E_1$, the design data coordinates corresponding to $(x^i_n, y^i_n)$ of the captured image are required. Since the initial external parameter $E_0$ and the internal parameter for calculating the virtual image are known, the design data coordinates of the coordinate system $(x^j_n, y^j_n)$ in which the design model is drawn may be obtained as $(X^j_n, Y^j_n, Z^j_n)$ by inversely transforming the projective transformation. If all the correspondences between $(x^i_n, y^i_n)$ and $(X^j_n, Y^j_n, Z^j_n)$ in the feature point pairs used to solve the PnP problem are correct, the temporary external parameter $E_1$ is an external parameter which may be correctly superimposed (also referred to as superposition).

Since the virtual image is an image generated by simulation, there is no guarantee that the correspondence of each feature point pair is correct. The diagnostic unit 42 diagnoses the reliability of the temporary external parameters. The diagnostic unit 42 diagnoses the reliability of the temporary external parameter $E_1$ by comparing the initial external parameter $E_0$ which is considered to be correct with the temporary external parameter $E_1$. The diagnostic unit 42 saves, in the storage device 24 such as the memory 12, the reliable feature point pairs used in estimating the temporary external parameter $E_1$ with reliability equal to or higher than a given value, based on the diagnosis result of the reliability of the temporary external parameter $E_1$.

Figure 3:
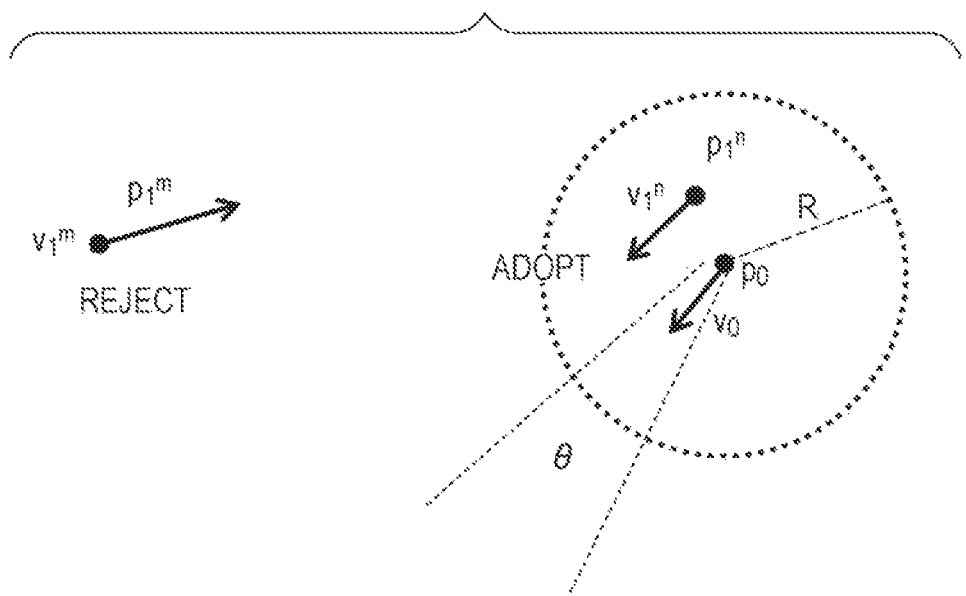
FIG. 3 is a diagram for explaining an example of a method of diagnosing reliability of a temporary external parameter.

FIG. 3 is a diagram for explaining an example of a method of diagnosing reliability of a temporary external parameter. When diagnosing the reliability of the temporary external parameter $E_1$, the external parameter is expressed by two parameters of a position p of the camera 23 and a line-of-sight vector v indicating an orientation of the camera 23. For example, the initial external parameter $E_0$ may be represented by $p_0$ and $v_0$. The temporary external parameter $E_1$ may be expressed by $p_1^k$ and $v_1^k$. At this time, if the position p is distanced from $p_0$ the radius R as illustrated in FIG. 3, or if the angle difference of the line-of-sight vector v is larger than θ, it is determined that the correspondence of feature point pairs is not correct. On the contrary, in other cases it is determined that the correspondence of feature point pairs used to estimate the temporary external parameter $E_1$ is reliable. For example, the temporary external parameter $E_1$ expressed by $p_1^m$ and $v_1^m$ is rejected, and the temporary external parameter $E_1$ expressed by $p_1''$ and $v_1''$ is adopted. The determination condition in the case where the correspondence between feature point pairs is determined to be reliable may be expressed, for example, as follows.

$$\begin{cases} \|(p_0 - p_1^k)\|_2 \le R \\ \cos^{-1}(v_o \cdot v_1^k) \le \theta \end{cases}$$

For example, a plurality of feature point pairs are randomly selected from the plurality of searched feature point pairs, and the feature point pairs used in the calculation of temporary external parameters with reliability equal to or higher than a given value are added to the record. Accordingly, it is possible to sort out feature point pairs used to calculate the reliable temporary external parameter with reliability recorded at last is equal to or higher than a given value.

It is preferable that the calculation unit 41 performs following feature point exclusion process before the diagnostic unit 42 calculates the reliability of the temporary external parameter $E_1$ using the plurality of searched feature point pairs. For example, when the distance between the corresponding feature points of the captured image and the virtual image in the image is equal to or greater than a given distance, it is preferable that the feature points are regarded as corresponding errors and excluded from the searched feature point pairs. By such a feature point exclusion process, it is possible to reliably exclude an object which is clearly not a feature point pair in the captured image, and to significantly reduce the calculation amount and calculation time of the calculation unit 41 and the diagnostic unit 42.

The calculation unit 43 selects a specified number (for example, k) of feature point pairs with a score value indicating the similarity between two feature points forming each feature point pair is equal to or higher than a threshold value among the feature point pairs used to calculate temporary external parameters with reliability equal to or higher than a given value. The calculation unit 43 evaluates the superposition state of the camera image and the virtual image with the evaluation value, and, among the k number of selected feature point pairs, selects feature point pairs with the evaluation value equal to or higher than a fixed value, and calculates the final external parameter $E_2$ using the selected feature point pairs. The calculation unit 43 superimposes the captured image of the product 20 and the design data of the product 20 using the final external parameter $E_2$ and displays it on the display screen of the display device 26. The calculation unit 43 superimposes the captured image of the product 20 and the design data of the product 20 using the final external parameter $E_2$ and displays it on the display screen of the display device 26, and thereby representing the image to the user. Accordingly, it is possible to improve the superposition accuracy when superimposing and drawing the design data of the product 20 on the captured image of the product 20 without depending on the skill of the user.

The part corresponding to the image capturing control unit 31 to the pair generation unit 40 of the processing unit 22 may form an example of first means. The first means searches the captured image and the virtual image generated from the projective-transformed image for a plurality of feature point pairs in which local feature amounts in the image are similar using local feature amount matching in a state in which the captured image of the product 20 and the projective-transformed image of the three-dimensional design data substantially overlap each other on the display screen. The part corresponding to the calculation unit 41 of the processing unit 22 may form an example of second means. The second means estimates a temporary external parameter $E_1$ related to the position and orientation of the image capturing device with respect to the measurement target from the feature point pairs randomly selected from the plurality of searched feature point pairs.

The part corresponding to the diagnostic unit 42 of the processing unit 22 may form an example of third means. The third means diagnoses the reliability of the temporary external parameter $E_1$ by comparing the initial external parameter $E_0$ with the temporary external parameter $E_1$, and record reliable feature point pairs used to calculate the temporary external parameter with reliability equal to or higher than a given value. The calculation unit 43 of the processing unit 22 may form an example of fourth means. The fourth means selects, from among the reliable feature point pairs, a specified number (k) of feature point pairs with a score value indicating the similarity between two feature points forming each feature point pair is equal to or higher than a threshold value, estimate the final external parameter $E_2$ using the selected feature point pair, and superimpose and display the captured image and the projective-transformed image using the final external parameter $E_2$.

The part corresponding to the image capturing control unit 31 to the virtual image storage unit 39 of the processing unit 22 may form an example of generation means. The generation means generates, by simulation, a virtual image including a plurality of computer graphic (CG) images with different defocus amounts and a normal image using the initial external parameter $E_0$ in the state where the captured image and the projective-transformed image substantially overlap each other on the display screen. The pair generation unit 40 of the processing unit 22 may form an example of means for searching the captured image and each virtual image for a plurality of feature point pairs with similar local feature amounts of the image using the matching of the local feature amount.

The part corresponding to the image capturing control unit 31 to the virtual image storage unit 39 of the processing unit 22 may form an example of generation means. This generation means generates, by simulation, a plurality of virtual images including a plurality of CG images with different illumination and defocus amount and a plurality of normal images with different defocus amounts using the initial external parameter $E_0$ in a state where the captured image and the projective-transformed image substantially overlap each other on the display screen.

The above-described second means may exclude the feature point from the plurality of searched feature point pairs when the distance between the feature point of the captured image displayed on the display screen and the corresponding feature point of the virtual image is equal to or greater than a given distance before calculating the temporary external parameter $E_1$ using the plurality of searched feature point pairs.

When the line-of-sight direction and position of the image capturing device obtained from external parameters estimated from the feature points of the virtual image and the feature points of the captured image and the line-of-sight direction and position of the image capturing device obtained from initial external parameters deviate from each other by an extent equal to or larger than a fixed amount, the third means may not record the feature point as a reliable feature point pair.

The above-described fourth means may superimpose the captured image and the projective-transformed image and display them on the display screen using a plurality of feature point pairs which satisfy at least one of given conditions between the given condition regarding the inter-coordinate distance obtained from feature point pairs randomly selected from the plurality of searched feature point pairs and the given condition regarding the line-of-sight direction and position.

The fourth means may select a specified number (k) of feature point pairs with a score value equal to or higher than a threshold value randomly or in descending order of score values, may evaluate the superposition state of the captured image and the virtual image with the evaluation value, and may calculate the final external parameter $E_2$ using feature point pairs with an evaluation value equal to or higher than a fixed value among the specified number of (k) selected feature point pairs.

Figure 4:
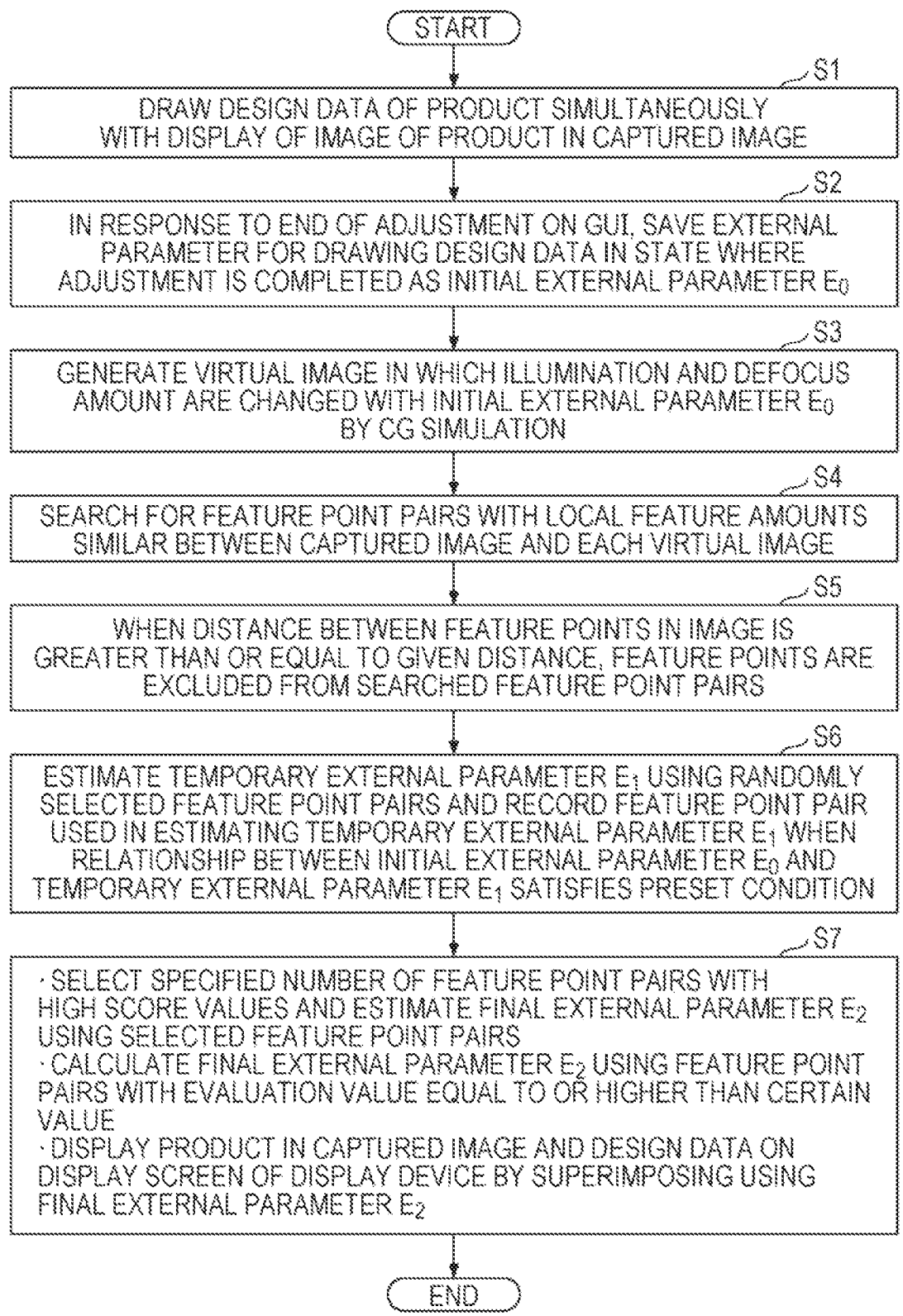
FIG. 4 is a flowchart for explaining an example of a measurement process according to a first embodiment.

FIG. 4 is a flowchart for explaining an example of a measurement process according to a first embodiment. The measurement process illustrated in FIG. 4 may be executed by the CPU 11 illustrated in FIG. 1 executing a measurement program stored in the memory 12. For example, the measurement process illustrated in FIG. 4 may be executed by each unit of the processing unit 22 illustrated in FIG. 2.

The measurement process illustrated in FIG. 4 starts, for example, when the user gives an instruction to start the measurement process from the inputting device 13. In FIG. 4, when the measurement process starts, the CPU 11 displays the captured image of the product 20 captured by the camera 23 on the display device 26 at the same time as drawing the design data of the product 20 on the display device 26 in step S1. For example, the image capturing control unit 31 controls the camera 23 so as to capture an image of the product 20, and the image storage unit 32 temporarily saves the captured image captured by the camera 23 in the storage device 24 such as the memory 12, for example. The reading unit 33 reads design data, which is CAD data of the product 20 from the storage device 24 such as the memory 12, and the determination unit 34 displays the captured image of the product 20 on the display device 26 while drawing the design data of the product 20 on the display device 26. Here, the determination unit 34 may display on the display screen of the display device 26 a message prompting the user to adjust the position, orientation, and scale when the design data is drawn.

The user adjusts the position, orientation, and scale at which the design data is drawn on the known GUI by a known method by operating the inputting device 13 such as a mouse and a keyboard so that the captured image of the product 20 and the drawn design data of the product 20 displayed on the display screen of the display device 26 substantially overlap each other.

Figure 5:
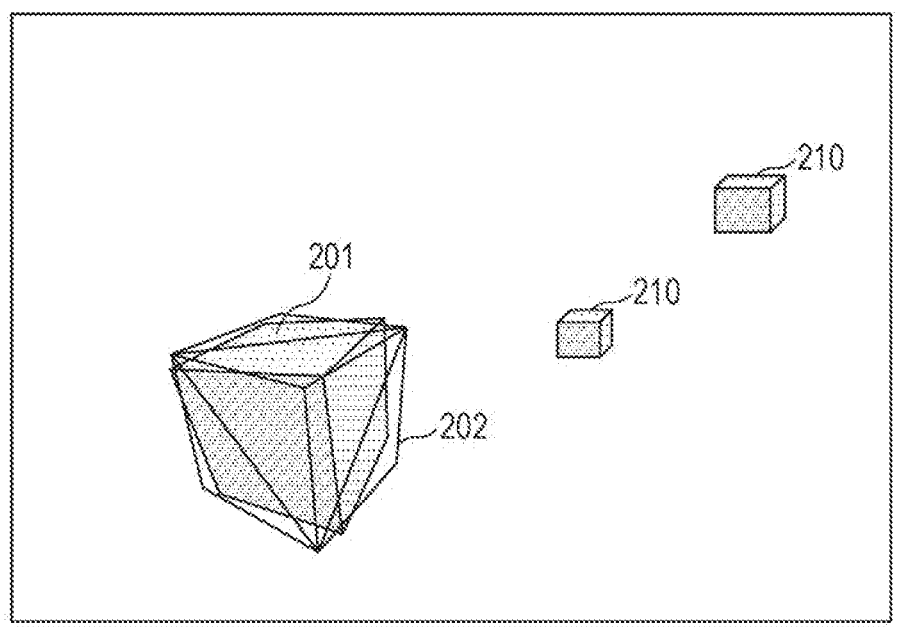
FIG. 5 is a diagram for explaining an example of display on a display screen.

FIG. 5 is a diagram for explaining an example of display on a display screen. In this example, a camera image, which is an example of a captured image, includes an image 201 of the product 20, which is an example of a superposition target and an image 210 of a peripheral part, which is an example of a non-superposition target. As illustrated in FIG. 5, due to the adjustment on the GUI by the user, the image 201 of the product 20 in the camera image and the design data 202 of the product 20 substantially overlap each other on the display screen.

In step S2, in response to the end of adjustment on the GUI by the user, the CPU 11 saves the external parameter for drawing design data in the state in which the adjustment is completed as the initial external parameter $E_0$. For example, the determination unit 34 calculates the initial external parameter $E_0$, and, saves it in the storage device 24 such as the memory 12, for example. The CPU 11 may recognize the end of adjustment on the GUI by the user, for example, from an end notification that the CPU 11 receives from the inputting device 13 according to the operation of the inputting device 13 by the user.

In step S3, the CPU 11 generates, by CG simulation, a virtual image (CG image and normal image) in which the illumination and defocus amount are changed with the initial external parameter $E_0$. For example, the CG image generation unit 36 generates a CG image using the saved initial external parameter $E_0$. In this example, a plurality of illumination conditions are generated in advance by the illumination condition generation unit 35, and the CG image generation unit 36 generates a plurality of CG images according to these plurality of illumination conditions. The normal image generation unit 37 generates a normal image using the saved initial external parameter $E_0$.

Figure 6:
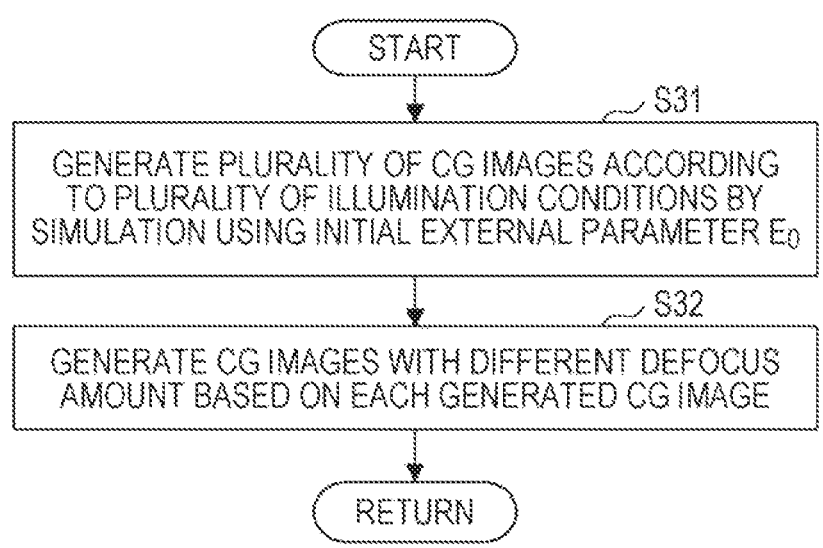
FIG. 6 is a flowchart for explaining an example of a CG image generation process.

FIG. 6 is a flowchart for explaining an example of a CG image generation process. The process illustrated in FIG. 6 may be executed by the CPU 11 illustrated in FIG. 1 executing a program stored in the memory 12. For example, the process illustrated in FIG. 6 may be executed by the illumination condition generation unit 35, the CG image generation unit 36, the defocus adding unit 38, and the virtual image storage unit 39 illustrated in FIG. 2.

In FIG. 6, the CPU 11 generates, by simulation, a plurality of CG images corresponding to the plurality of illumination conditions using the saved initial external parameter $E_0$ in step S31. For example, the CG image generation unit 36 generates, by simulation, a plurality of corresponding CG images according to the plurality of illumination conditions generated by the illumination condition generation unit 35 using the initial external parameter $E_0$. In step S32, the CPU 11 generates a CG image in which the defocus amount is changed based on the generated CG images, and the process proceeds to step S4 illustrated in FIG. 4. For example, the virtual image storage unit 39 temporarily saves, in the storage device 24 such as the memory 12, the CG image generated by the defocus adding unit 38 changing the defocus amount of each CG image.

Figure 7:
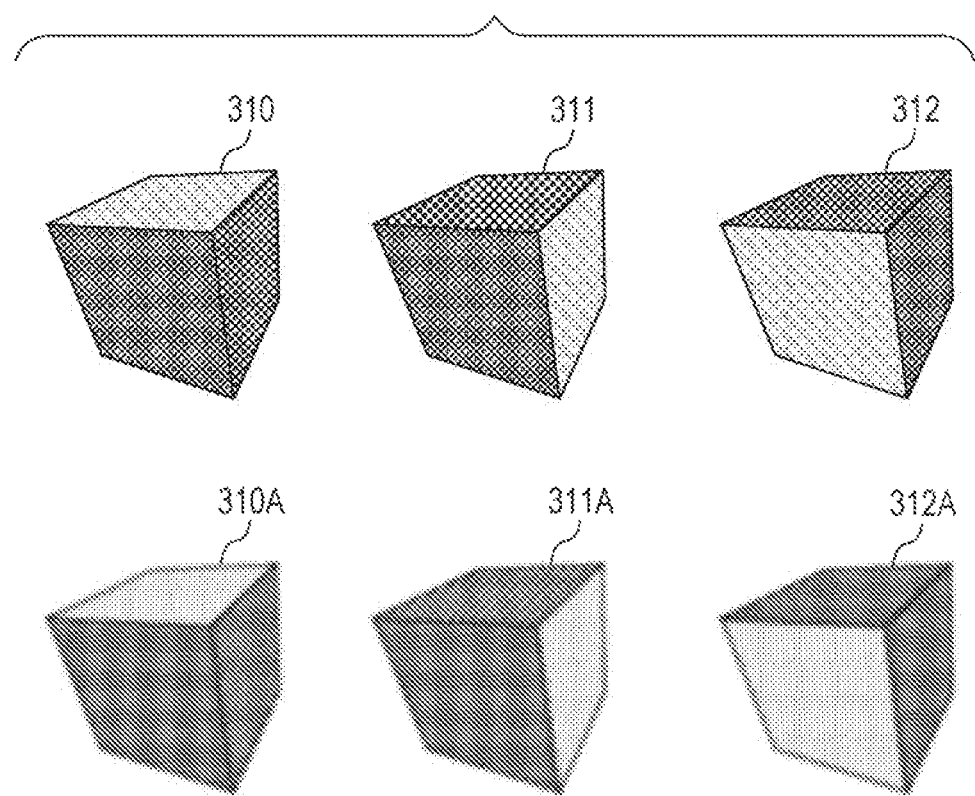
FIG. 7 is a diagram illustrating an example of the CG image.

FIG. 7 is a diagram illustrating an example of the CG image. In FIG. 7, CG images 310A to 312A are obtained by changing the defocus amount of CG images 310 to 312. In this example, one CG image is generated by changing the defocus amount of one CG image, but a plurality of CG images may be generated in which one CG image is changed by different defocus amounts.

Figure 8:
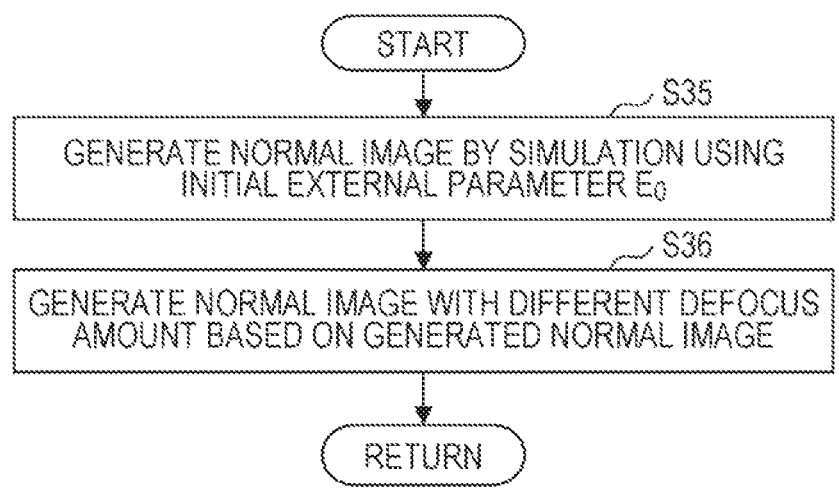
FIG. 8 is a flowchart for explaining an example of a normal image generation process.

FIG. 8 is a flowchart for explaining an example of a normal image generation process. The process illustrated in FIG. 8 may be executed by the CPU 11 illustrated in FIG. 1 executing a program stored in the memory 12. For example, the process illustrated in FIG. 8 may be executed by the normal image generation unit 37, the defocus adding unit 38, and the virtual image storage unit 39 illustrated in FIG. 2.

In FIG. 8, the CPU 11 generates a normal image by simulation using the saved initial external parameter $E_0$ in step S35. For example, the normal image generation unit 37 generates a normal image by simulation using the initial external parameter $E_0$. In step S36, the CPU 11 generates a normal image in which the defocus amount is changed based on the generated normal image, and the process proceeds to step S4 illustrated in FIG. 4. For example, the virtual image storage unit 39 temporarily saves, in the storage device 24 such as the memory 12, a plurality of normal images generated by the defocus adding unit 38 changing the defocus amount of the normal image.

Figure 9:
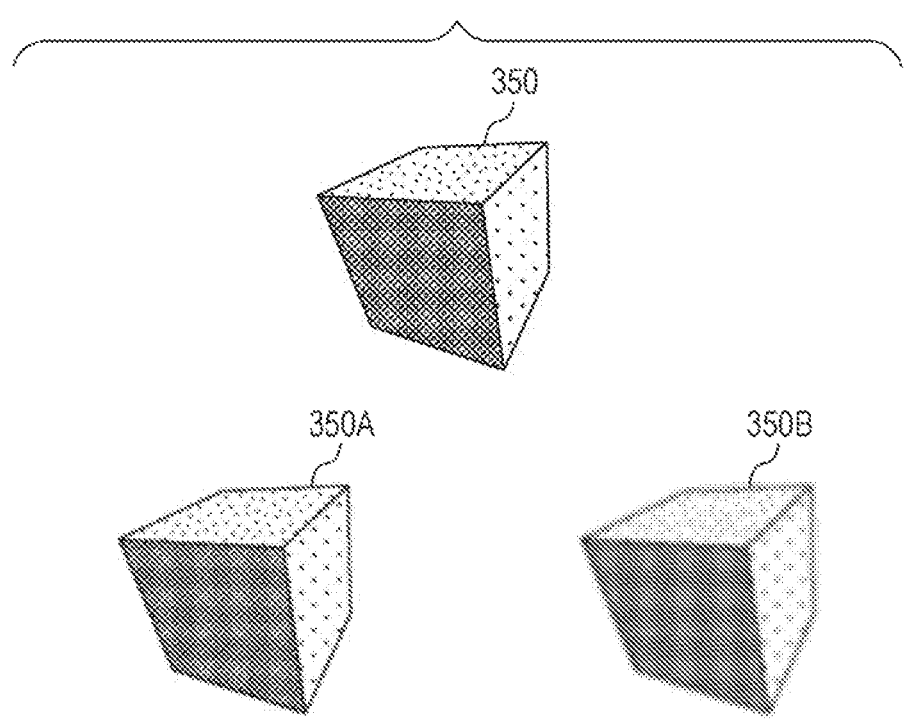
FIG. 9 is a diagram illustrating an example of a normal image.

FIG. 9 is a diagram illustrating an example of a normal image. In FIG. 9, normal images 350A and 350B are obtained by changing the defocus amount of a normal image 350, and the defocus amount of the normal image 350B is larger than the defocus amount of the normal image 350A. In this example, a plurality of normal images are generated by changing different defocus amounts of one normal image, but one normal image may be generated by changing the defocus amount of one normal image.

Figure 10:
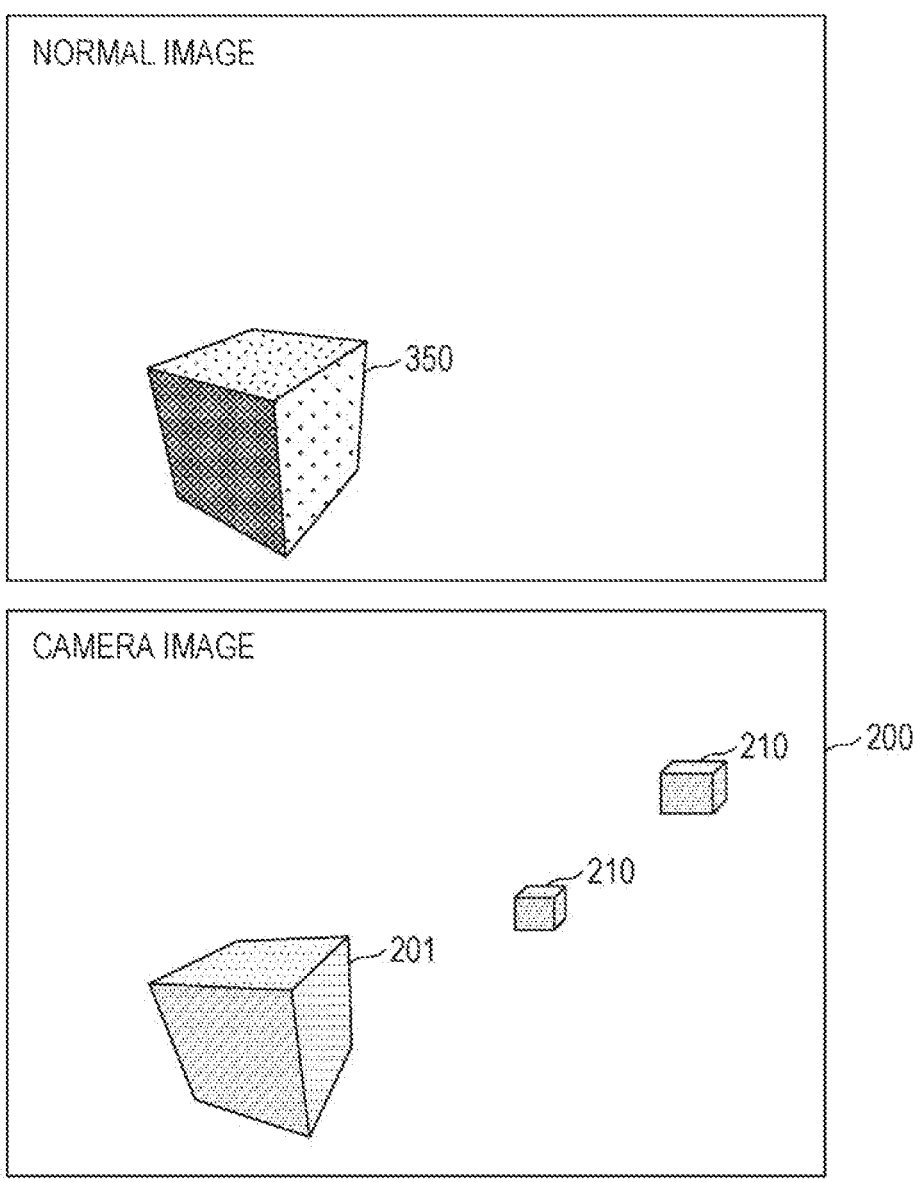
FIG. 10 is a diagram illustrating an example of the normal image and a camera image.

FIG. 10 is a diagram illustrating an example of the normal image and a camera image. Although FIG. 10 illustrates the normal image 350 and a camera image 200 related to the same the product 20 separately for the sake of convenience to easily see the corresponding point and the like, the actual display on the display screen of the display device 26 is illustrated in FIG. 5, for example.

Returning to the explanation of FIG. 4, the process in steps S4 to S7 is executed on the captured image and each virtual image generated in step S3, and when the final external parameter $E_2$ is estimated for a certain virtual image, the process of other virtual images is not performed. For example, if the final external parameter $E_2$ estimated using one of the virtual images is good, the process ends at that point. If the estimated final external parameter $E_2$ is good, the superposition state of the camera image and the virtual image is good, and the evaluation value is high.

In step S4, the CPU 11 searches for feature point pairs with similar local feature amounts between the captured image and each virtual image. For example, the virtual image generated by the CG image generation unit 36 and the normal image generation unit 37 is supplied to the defocus adding unit 38, and the defocus adding unit 38 newly generates a virtual image in which the defocus amount is changed based on each virtual image. The virtual image storage unit 39 temporarily saves, in the storage device 24 such as the memory 12, the virtual image generated by the defocus adding unit 38. The pair generation unit 40 searches the captured image saved by the image storage unit 32 and each virtual image generated by the above-described procedure for feature point pairs with similar local feature amounts, using a known method. For example, the pair generation unit 40 searches for a feature point pair with a matching score value which is an example of a score indicating the similarity is equal to or higher than a threshold value.

Figure 11:
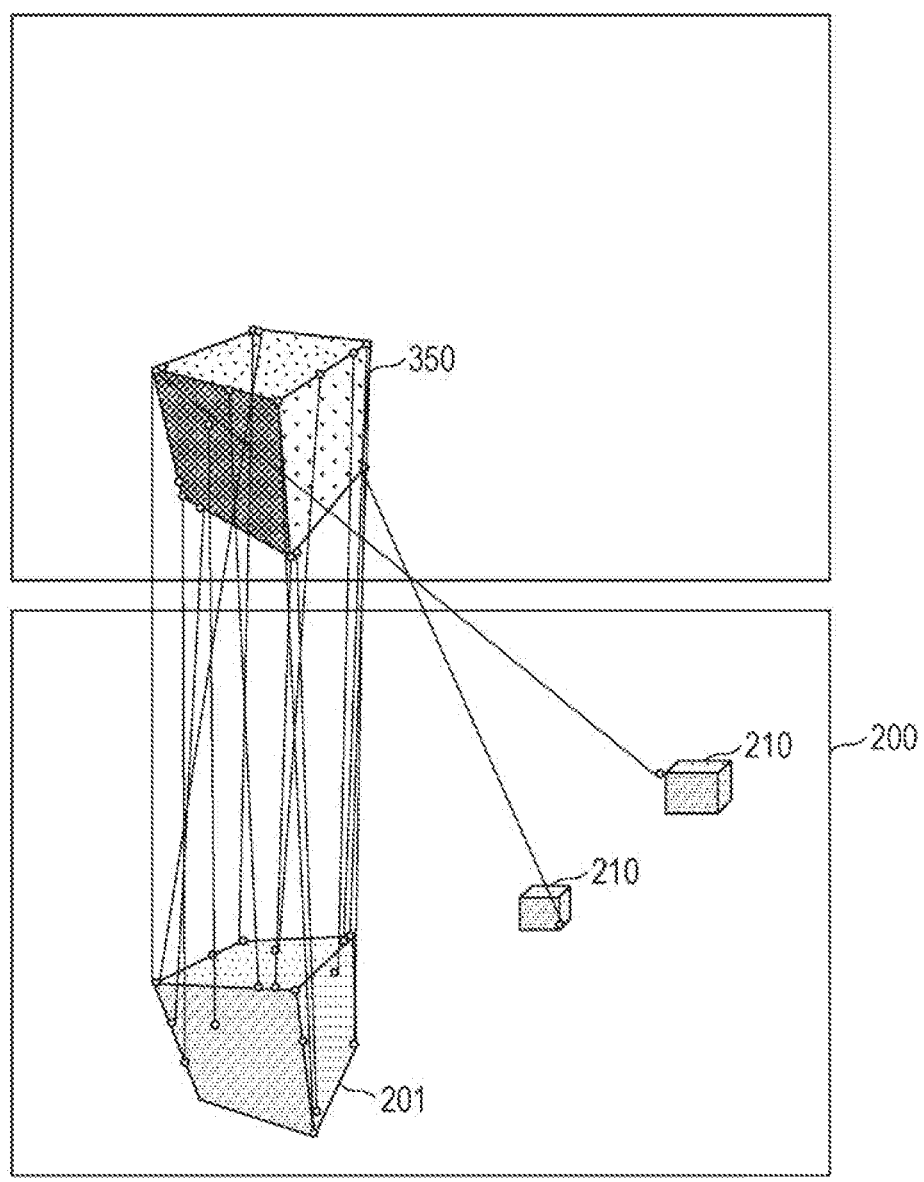
FIG. 11 is a diagram illustrating an example of a feature point pair of the normal image and the camera image.

FIG. 11 is a diagram illustrating an example of a feature point pair of the normal image and the camera image. In FIG. 11, the same parts as in FIG. 10 are indicated by the same reference numerals and the explanation thereof will be omitted. In FIG. 11, feature points are indicated by ○ marks, and feature points of a feature point pair with a score value indicating similarity are equal to or higher than a threshold value are illustrated with thin solid lines. Although illustration is omitted, the feature point pair of a CG image and a camera image may be obtained as in the case of FIG. 11.

Returning to the explanation of FIG. 4, in step S5, when the distance between the feature points of the feature point pair in the image is equal to or greater than the given distance, the CPU 11 excludes the feature point from the searched feature point pairs as a corresponding error. For example, the calculation unit 41 excludes the feature point from the searched feature point pairs when the distance between the feature points in the image is distanced equal to or greater than the given distance before calculating the temporary external parameter $E_1$ using the searched plurality of feature point pairs. The distance between the feature points in the image is the distance between the feature point of the captured image and the corresponding feature point of the virtual image displayed on the same display screen.

Figure 12:
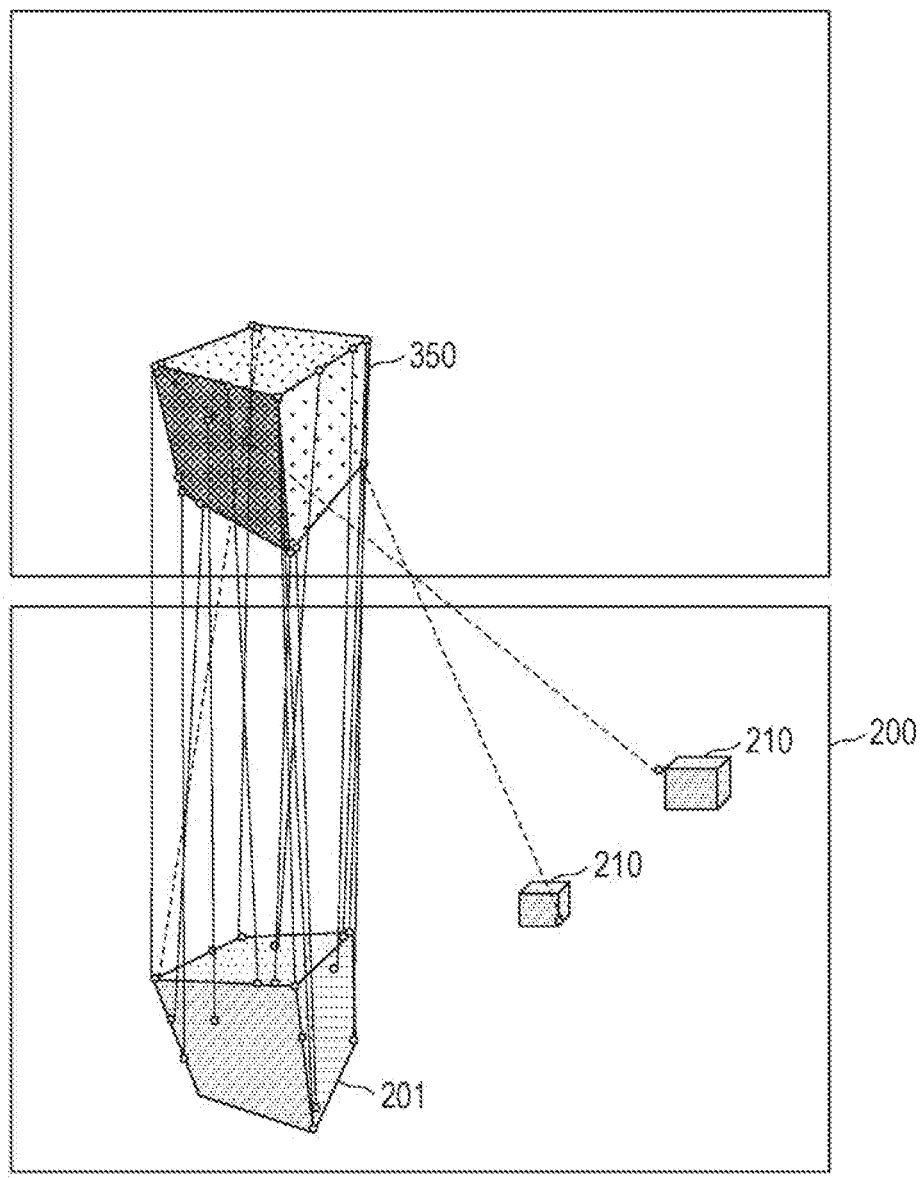
FIG. 12 is a diagram for explaining an example of the feature point pair of the normal image and the camera image to be excluded in a process of step S5 in FIG. 4.

FIG. 12 is a diagram for explaining an example of the feature point pair of the normal image and the camera image to be excluded in a process of step S5 in FIG. 4. In FIG. 12, the same parts as in FIG. 11 are indicated by the same reference numerals and the explanation thereof will be omitted. In FIG. 12, the feature points at significantly different positions in the image which are distanced by the given distance or more are indicated by broken lines. For example, the feature points of the normal image 350 and the feature points of the image 210 of the peripheral part forming the feature point pairs in the image are distanced equal to or greater than the given distance and the coordinate values in the image are largely different, and are unlikely the corresponding feature points of the image 201 of a product. The feature point pairs connected by broken lines formed by the feature points of the normal image 350 and the feature points of the image 210 of the peripheral part are excluded from the searched feature point pairs by the CPU 11 executing the process of step S5. Since the distance in the image is distanced equal to or greater than the given distance, and the coordinate values in the image are significantly different between the feature point at the upper back corner of the normal image 350 and the feature point at the left front corner of the image 201 of the product, the feature points are unlikely to be the corresponding feature points of the image 201 of the product. The feature point pairs connected by broken lines formed by the feature points of the normal image 350 and the feature points of the image 201 of the product are excluded from the searched feature point pairs by the CPU 11 executing the process of step S5. Although illustration is omitted, the feature point pairs of the CG image and the camera image may also be excluded as in the case of FIG. 12.

Returning to the explanation of FIG. 4, in step S6, the CPU 11 estimates the temporary external parameter $E_1$ using, for example, randomly selected feature point pairs. For example, the calculation unit 41 randomly selects, for example, N number of feature point pairs from the searched feature point pairs, and estimates the temporary external parameter $E_1$ by solving the PnP problem using the N number of selected feature point pairs. In step S6, when the relationship between the initial external parameter $E_0$ and the estimated temporary external parameter $E_1$ satisfies a preset condition, the CPU 11 records the feature point pairs used when the temporary external parameter $E_1$ is estimated. For example, when the relationship between the initial external parameter $E_0$ and the estimated temporary external parameter $E_1$ satisfies a preset condition, the calculation unit 41 records the feature point pairs used when the temporary external parameter $E_1$ is estimated.

Figure 13:
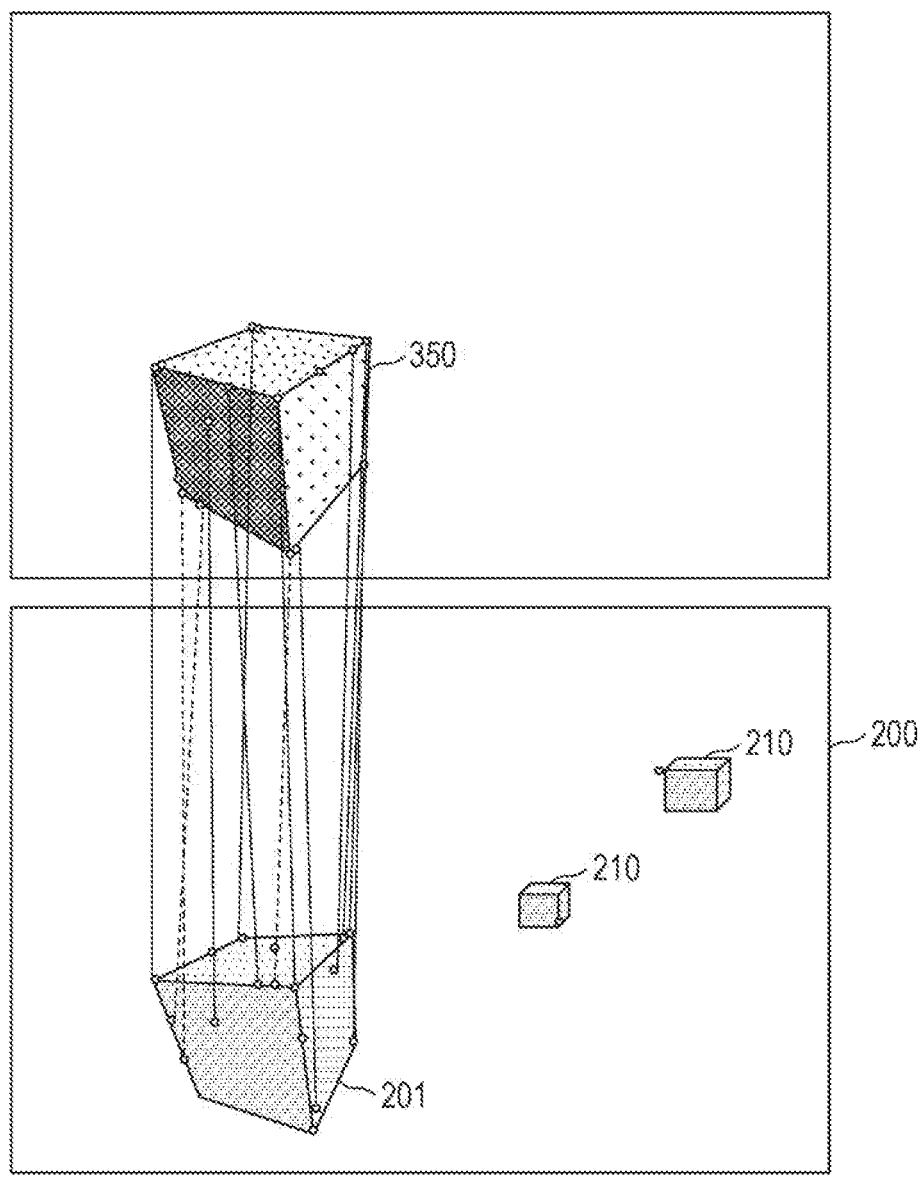
FIG. 13 is a diagram illustrating an example of the feature point pair of the normal image and the camera image to be excluded in a process of step S6 in FIG. 4.

FIG. 13 is a diagram illustrating an example of the feature point pair of the normal image and the camera image to be excluded in a process of step S6 in FIG. 4. In FIG. 13, the same parts as in FIG. 12 are indicated by the same reference numerals and the explanation thereof will be omitted. In FIG. 13, feature points with positions on the product 20 significantly different from each other are illustrated with broken lines. For example, the feature points of the normal image 350 and the feature points of the image 201 of the product 20 illustrated with broken lines are unlikely to be corresponding feature point. The feature points of the normal image 350 and the feature points of the image 201 of the product 20 illustrated with broken lines are excluded from the searched feature point pairs by the CPU 11 executing the process of step S6. Although illustration is omitted, the feature point pairs of the CG image and the camera image may also be excluded as in the case of FIG. 13.

When the randomly selected feature point pairs include the feature point pairs illustrated with broken lines in FIG. 13, the initial external parameter $E_0$ and the temporary external parameter $E_1$ are largely different, and the value expressed in the above-described equation 1 becomes larger. For example, the feature point pair illustrated with broken lines in FIG. 13 are not selected as a feature point pair with high reliability, and are finally recorded as reliable feature point pairs.

As described above, the random selection of the feature point pairs by the CPU 11 (the calculation unit 41 and the diagnostic unit 42), the calculation of temporary external parameter $E_1$, the reliability diagnosis of the temporary external parameter $E_1$, and the recording of reliable feature point pairs are repeated until a reliable feature point pair is determined. As described above, a reliable feature point pair is a feature point pair used when estimating the temporary external parameter $E_1$ with reliability equal to or higher than the given value.

Figure 14:
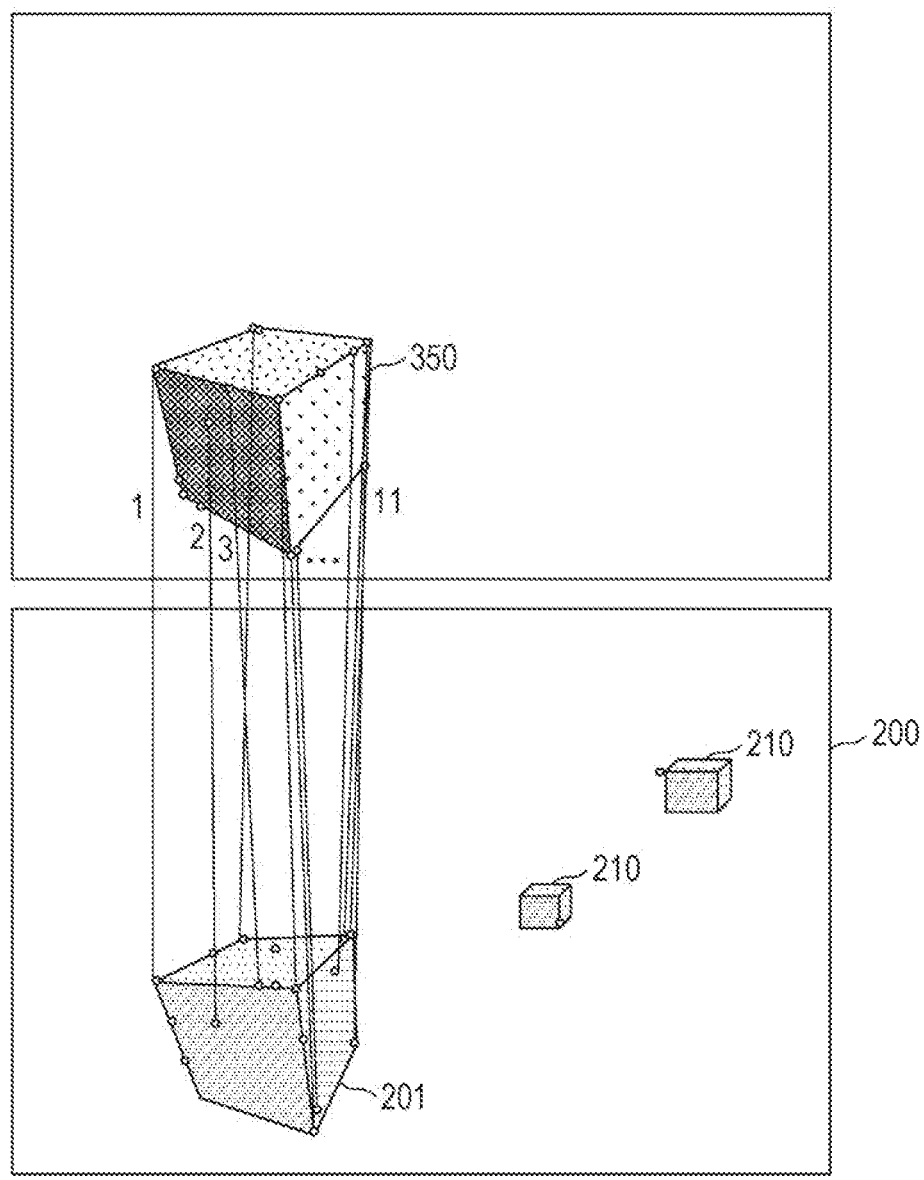
FIG. 14 is a diagram illustrating an example of a result of the process of steps S5 and S6 in FIG. 4.

FIG. 14 is a diagram illustrating an example of a result of the process of steps S5 and S6 in FIG. 4. In FIG. 14, the same parts as in FIG. 12 and FIG. 13 are indicated by the same reference numerals and the explanation thereof will be omitted. In FIG. 14, for example, feature points connected by broken lines in FIG. 12 and FIG. 13 are excluded, and the feature point pair numbers of the feature point pairs of "1", "2", "3", . . . , "11" determined to have high reliability are illustrated connected by thin solid lines. Although illustration is omitted, the feature point pairs of the CG image and the camera image may also be obtained as in the case of FIG. 14.

Returning to the explanation of FIG. 4, in step S7, the CPU 11 selects a specified number of feature point pairs with a score value indicating the similarity of corresponding points equal to or higher than a threshold value in the plurality of recorded feature point pairs and estimates the final external parameter $E_2$ using the selected feature point pairs. For example, the calculation unit 43 selects k number of feature point pairs with a score value indicating the similarity of the corresponding points equal to or higher than a threshold value among the feature point pairs with reliability of the temporary external parameter $E_1$ equal to or higher than a given value so that the final external parameter $E_2$, is calculated and saved in the storage device 24 such as the memory 12. The k number of feature point pairs with score values equal to or higher than a threshold value may be selected randomly or in descending order of score values. In step S7, the CPU 11 evaluates the superposition state of the camera image and the virtual image using the evaluation value, and selects feature point pair with the evaluation value equal to or higher than a fixed value among the k number of selected feature point pairs and estimates the final external parameter $E_2$ using the selected feature point pair. For example, the calculation unit 43 selects feature point pairs with the evaluation value equal to or higher than a fixed value among the k number of selected feature point pairs, and calculates the final external parameter $E_2$ using the selected feature point pair. Preferably, among the k number of selected feature point pairs, the top n ($\leq$k) number of feature point pairs with the evaluation values equal to or higher than a fixed value are selected. In step S7, the CPU 11 superimposes the captured image of the product 20 and the design data of the product 20 and displays them on the display screen of the display device 26 using the final external parameter $E_2$, and the process ends. For example, the calculation unit 43 superimposes the captured image of the product 20 and the design data of the product 20 using the final external parameter $E_2$ and displays it on the display screen of the display device 26, and thereby representing the image to the user.

Figure 15:
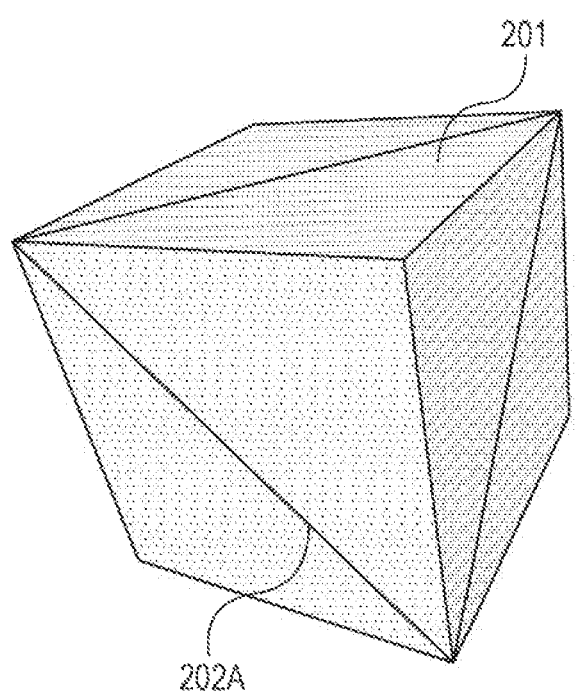
FIG. 15 is a diagram illustrating an example of a result of a process of step S7 in FIG. 4.

FIG. 15 is a diagram illustrating an example of a result of a process of step S7 in FIG. 4. In this example, the image 201 of the product 20 in the camera image and the design data 202A of the product 20 are accurately superimposed on the display screen, so that an operation of checking whether or not the product 20 is manufactured according to the design drawing may be easily performed. This checking operation may be performed by the user visually or by the CPU 11 using a known matching method.

Figure 16:
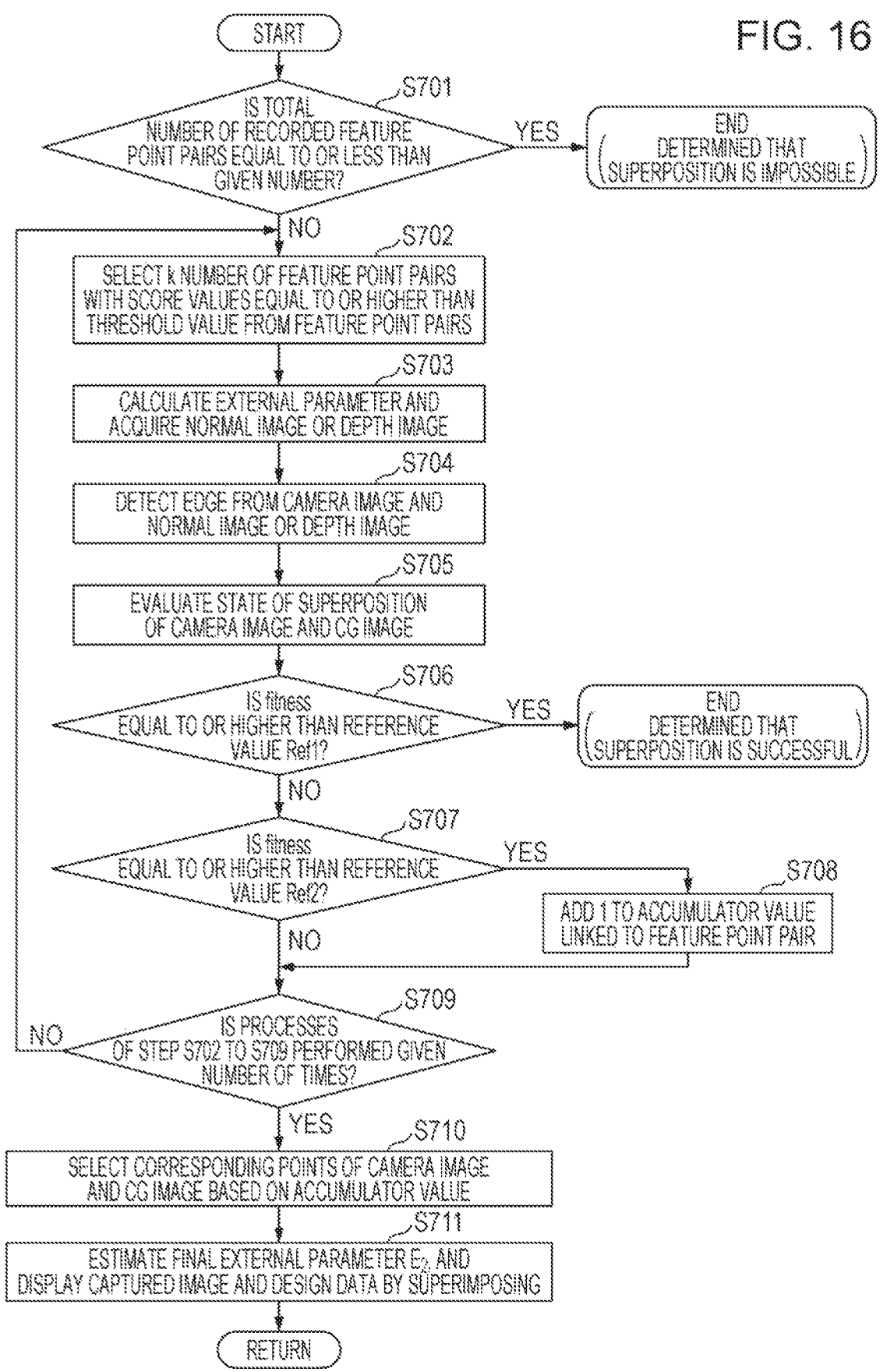
FIG. 16 is a flowchart for explaining the process of step S7 in FIG. 4 in more details.

FIG. 16 is a flowchart for explaining the process of step S7 in FIG. 4 in more details. The process illustrated in FIG. 16 may be executed by the CPU 11 illustrated in FIG. 1 executing a measurement program stored in the memory 12. For example, the process illustrated in FIG. 16 may be executed by the diagnostic unit 42 and the calculation unit 43 illustrated in FIG. 2. Although the process of FIG. 16 is explained using a CG image which is an example of a virtual image for convenience of explanation, it is possible to execute the same process as the process of FIG. 13 using a normal image which is an example of a virtual image.

In FIG. 16, in step S701, the CPU 11 determines whether or not the total number of feature point pairs recorded in step S6 of FIG. 4 is equal to or higher than a given number. When the determination result is YES, the CPU 11 determines that the superposition of the captured image of the product 20 and the design data of the product 20 is not possible, and the process ends. In this example, the given number is 5. For example, the calculation unit 43 determines whether or not the total number of the searched feature point pairs is equal to or less than 5, and when the determination result is YES, the calculation unit 43 determines that the captured image of the product 20 and the local feature amount of the design data of the product 20 to be superimposed are not similar, and ends the processing. On the other hand, when the determination result in step S701 is NO, the process proceeds to step S702.

In step S702, the CPU 11 selects, for example, k number of feature point pairs with score values indicating similarity of the corresponding point from the plurality of feature point pairs recorded in step S6 of FIG. 4 equal to or higher than a threshold value. For example, the calculation unit 43 selects k number of feature point pairs from the plurality of recorded feature point pairs. The k number of feature point pairs with score values equal to or higher than a threshold value may be selected randomly or in descending order of the score value.

Figure 17:
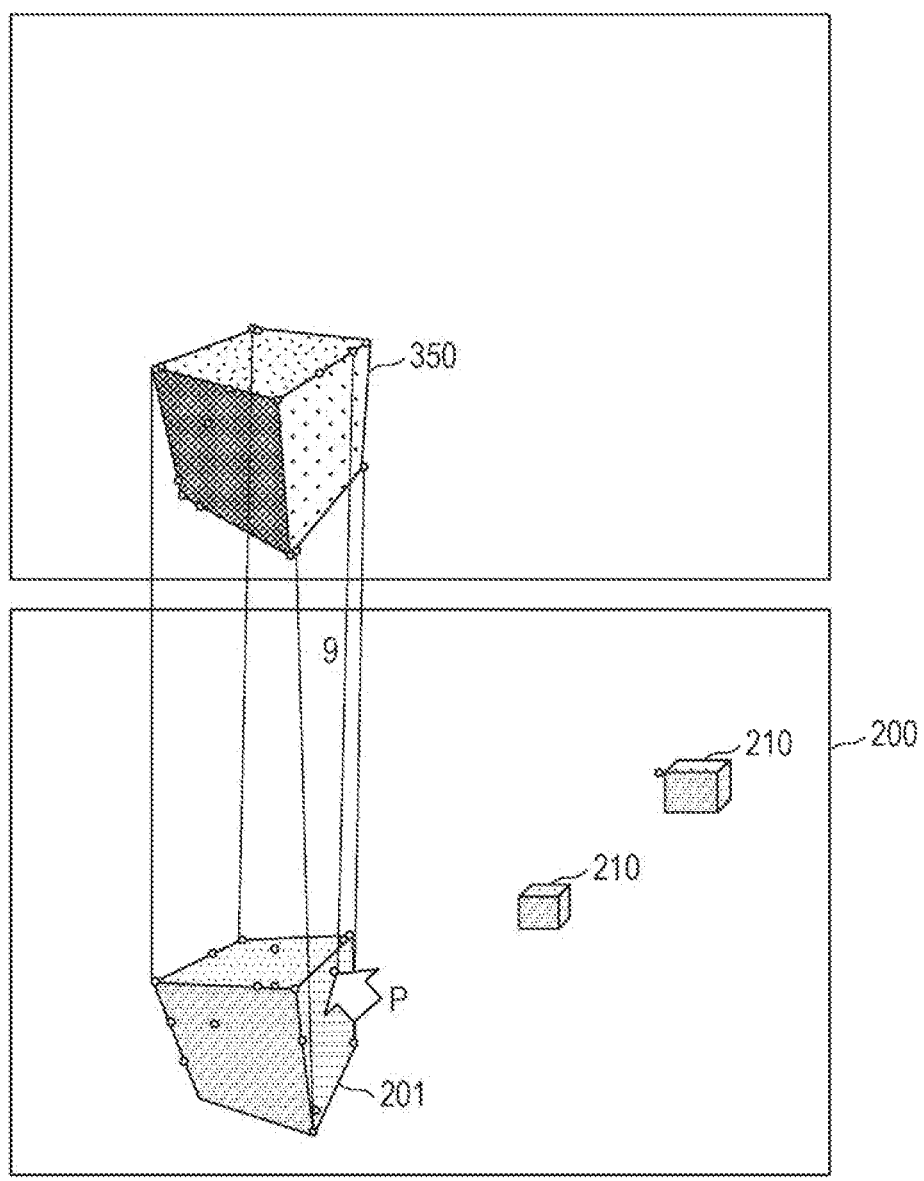
FIG. 17 is a diagram illustrating a first example searching for feature point pairs with score values indicating similarity equal to or higher than a threshold value, and are distanced from each other.

FIG. 17 is a diagram illustrating a first example searching for feature point pairs with score values indicating similarity equal to or higher than a threshold value, and are distanced from each other. In FIG. 17, the same parts as in FIG. 12 are indicated by the same reference numerals and the explanation thereof will be omitted. In FIG. 17, the score value indicating similarity is equal to or higher than a threshold value, and the distance between feature points of adjacent feature point pairs in the image is equal to or greater than a fixed distance. In this example, the CPU 11 randomly selects k=5 feature point pairs with score values indicating similarity equal to or higher than a threshold value, but the feature point pair of the feature point pair number "9" is not correct corresponding points. In the case of the feature point pair of the feature point pair number "9", the position of the feature point of the normal image 350 does not correspond to the position P of the feature point of the captured image.

Figure 18:
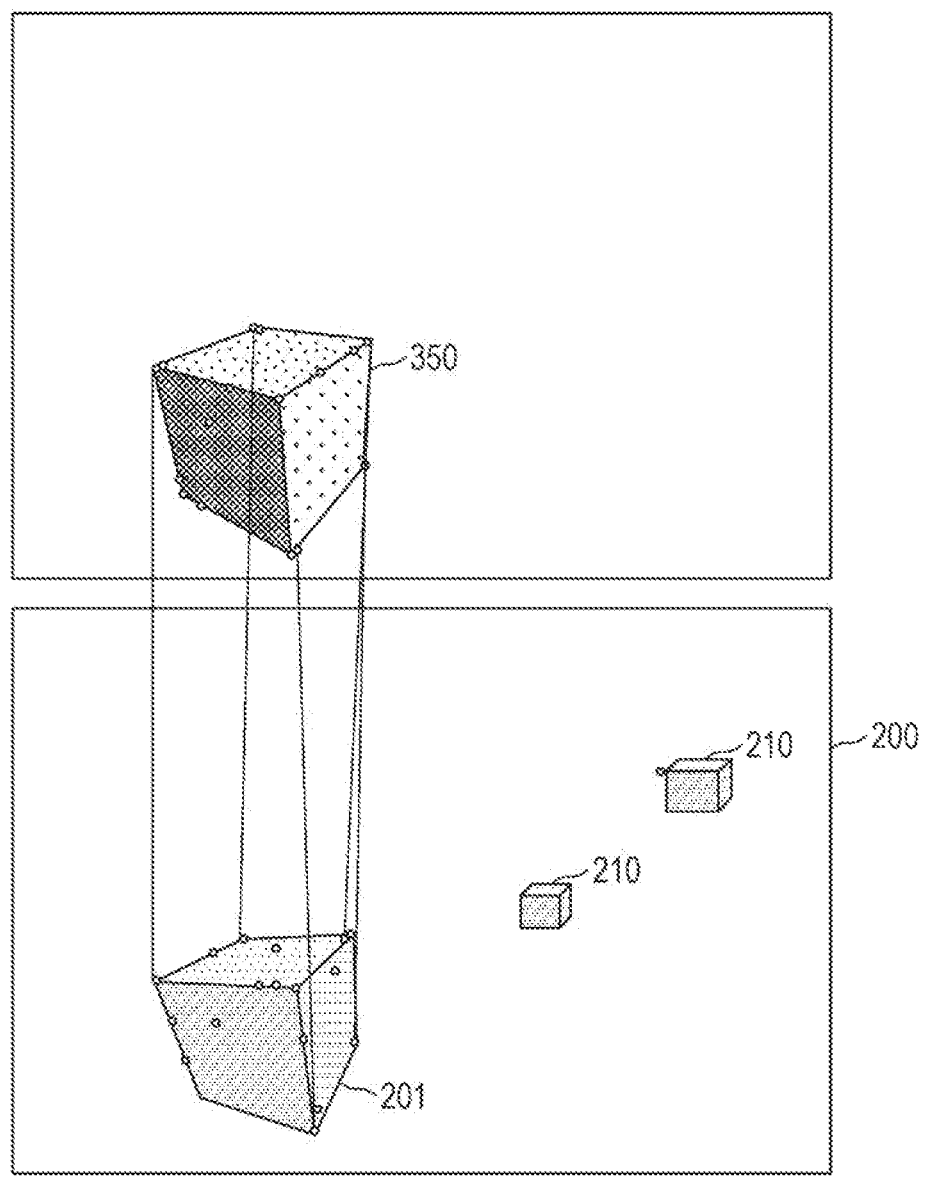
FIG. 18 is a diagram illustrating a second example searching for feature point pairs with score values indicating similarity equal to or higher than a threshold value, and are distanced from each other.

FIG. 18 is a diagram illustrating a second example searching for feature point pairs with score values indicating similarity equal to or higher than a threshold value, and are distanced from each other. In FIG. 18, the same parts as in FIG. 17 are indicated by the same reference numerals and the explanation thereof will be omitted. In FIG. 18, the score value indicating similarity is equal to or higher than a threshold value, and the distance between feature points of adjacent feature point pairs in the image is equal to or greater than a fixed distance. In this example, the CPU 11 selects top k=5 (for example, k pieces in the descending order of score values) feature point pairs with score values indicating similarity equal to or higher than a threshold value, and the feature point pairs are correct corresponding points.

Returning to the explanation of FIG. 16, in step S703, the CPU 11 calculates the external parameter $E_2$ and obtains a normal image or a depth image, or a normal image and a CG image or a depth image and a CG image. For example, the calculation unit 43 estimates the external parameter $E_2$ by solving the PnP problem using the k number of selected feature point pairs, and obtains the normal image generated by the normal image generation unit 37 or the depth image generated by the CG image generation unit 36. The calculation unit 43 may estimate the external parameter $E_2$ and may obtain the normal image generated by the normal image generation unit 37 and the CG image generated by the CG image generation unit 36 or may obtain the depth image and CG image generated by the CG image generation unit 36.

In step S704, the CPU 11 detects an edge from the camera image and the image acquired in step S703. For example, the calculation unit 43 detects an edge from the camera image and the normal image or the depth image, or the normal image and the CG image or the depth image and the CG image using a known method.

Figure 19:
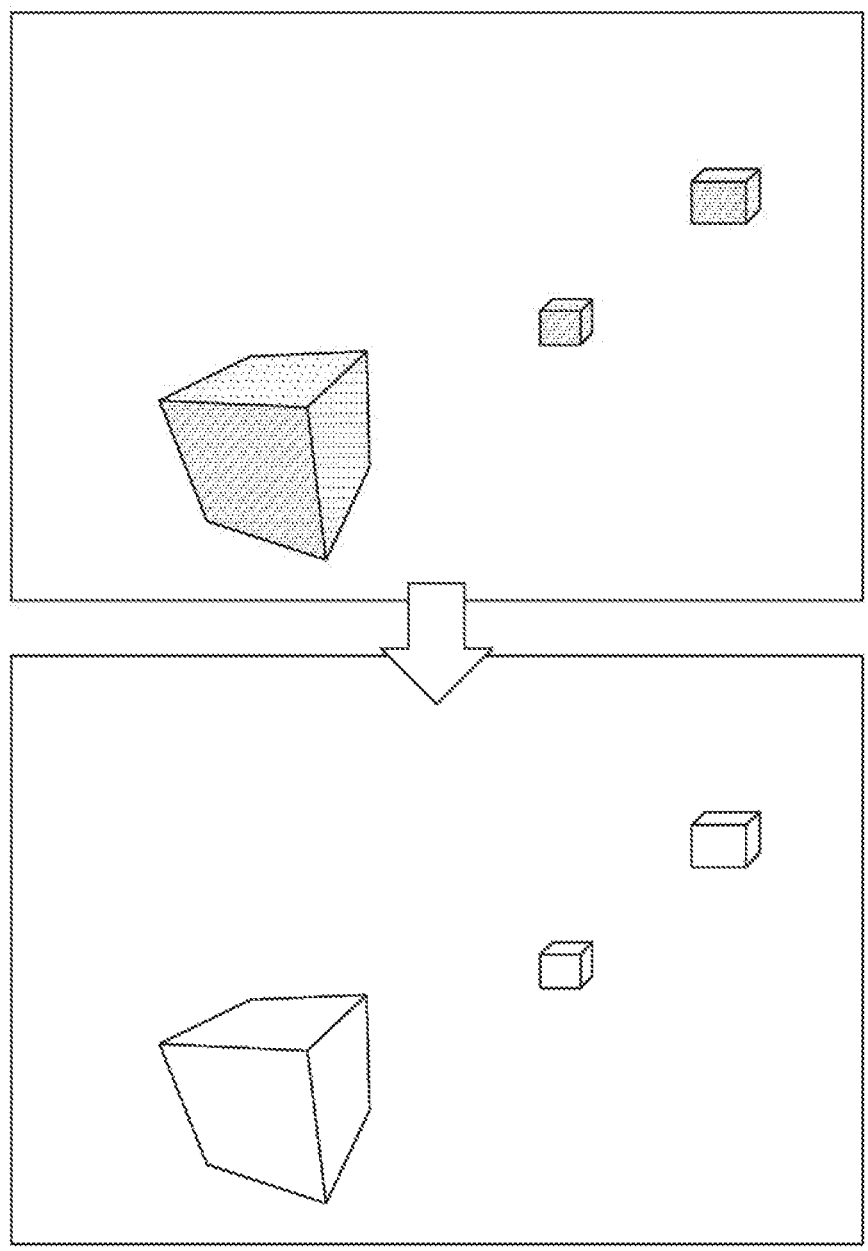
FIG. 19 is a diagram illustrating an edge detected from the camera image and the CG image.

FIG. 19 is a diagram illustrating an edge detected from the camera image and the normal image or the depth image, or the normal image and the CG image or the depth image and the CG image. In this example, the edge of the image of the product 20 and the edge of the image 210 of the peripheral part are detected. Although illustration is omitted, the edges of the camera image and the normal image may also be detected as in the case of FIG. 19.

Returning to the explanation of FIG. 16, in step S705, the CPU 11 evaluates the superposition state of the camera image and the CG image by the evaluation value. For example, the calculation unit 43 evaluates the superposition state of the camera image and the CG image from the superposition state of each edge by a known method. The superposition state of the edges of the camera image and the CG image may be evaluated together with the distance between edges. In this example, the superposition state of edges of the camera image and the CG image is evaluated by determination value fitness to determine the quality of the superposition state explained with FIG. 20 based on the distance between the edges.

Figure 20:
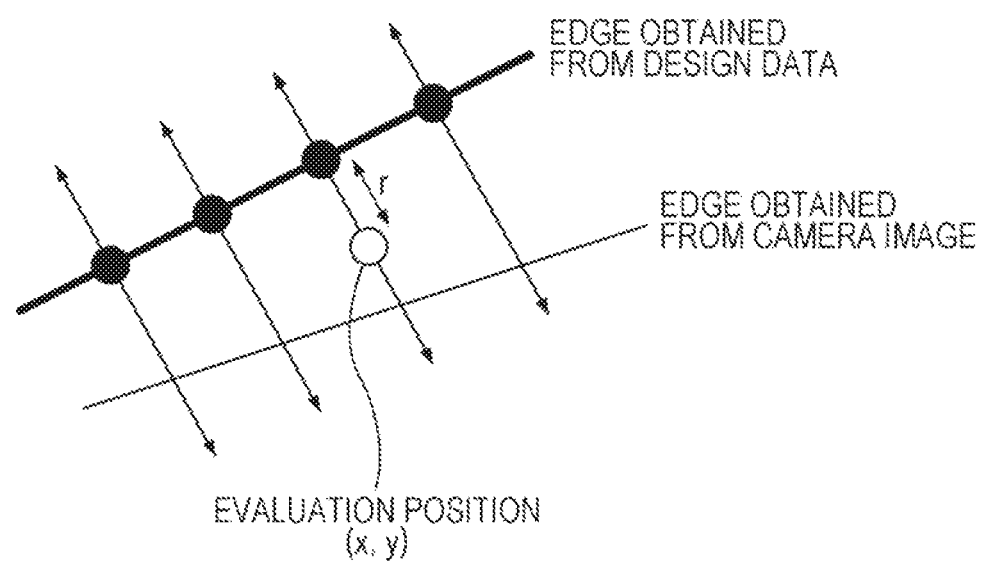
FIG. 20 is a diagram for explaining an example for evaluating a superposition state of the camera image and the CG image from a distance between edges.

FIG. 20 is a diagram for explaining an example for evaluating a superposition state of the camera image and the CG image from a distance between edges. In FIG. 20, 0 marks indicates points on the edges (for example, edges obtained from design data) of the CG image and a 0 mark indicates an evaluation position (x, y) located at a distance r from a point on the edge of the CG image between the edge of the CG image and the edge of the camera image. The determination value fitness for the determination of the quality of the superposition state may be obtained, for example, based on the next equation.

$$\text{fitness} = \frac{\sum_x \sum_y \sum_r \left( \frac{1}{1+|r|} \frac{p(x, y)}{255} \right)}{N}$$

x, y: evaluation position
r: distance
p(x, y): pixel at the evaluation position (0 or 255)
N: total number of evaluation points In step S706, the CPU 11 determines whether or not the determination value fitness to determine the quality of the superposition state is equal to or higher than a reference value Ref1. When the determination result is YES, the CPU 11 determines that the superposition of the captured image of the product 20 and the design data of the product 20 is successful, and the process ends. When the determination result of step S706 is NO, the process proceeds to step S707.

In step S707, the CPU 11 determines whether or not the determination value fitness to determine the quality of the superposition state is equal to or higher than a reference value Ref2 (<Ref1). When the determination result is YES, the process proceeds to step S708, and when the determination result is NO, the process proceeds to step S709. In step S708, the CPU 11 increments the value of an accumulator (or an adder) linked with the feature point pair by adding 1 to increment the process, and the process proceeds to step S709. The accumulator value is an example of an evaluation value that evaluates the superposition state of the camera image and the virtual image that is incremented when the determination value fitness that determines the quality of the superposition state is less than the reference value Ref1, and equal to or higher than reference value Ref2 (in the range of Ref2≤fitness<Ref1). In step S709, the CPU 11 determines whether or not the process of step S702 to S709 is performed a given number of loops, the process returns to step S702 when the determination result is NO, and the process proceeds to step S710 when the determination result is YES.

For example, when the determination value fitness by which the calculation unit 43 determines that the quality of the superposition state is equal to or higher than the reference value Ref1, the calculation unit 43 determines that the superposition of the camera image and the CG image is successful. When the determination value fitness by which the calculation unit 43 determines the quality of the superposition state is equal to or higher than the reference value Ref2, the calculation unit 43 increments the value of the accumulator in the calculation unit 43 linked to the feature point pair by adding 1, and maintains the accumulator value when the value is less than the reference value Ref2. Since the calculation unit 43 repeats the determination of the quality of the superposition state of steps S702 to S709 for a given number of loops, the selection of the above-described k number of feature point pairs is performed for a given number of loops. The given number of loops is, for example, 80 times, and as a result of repeating the determination of the quality of the superposition state, the determination value fitness that determines the quality of the superposition state of the camera image and the CG image is obtained. The determination value fitness that determines the quality of the superposition state of the camera image and the normal image and the determination value fitness that determines the quality of the superposition state of the camera image and the CG image are obtained in the same manner.

Figure 21:
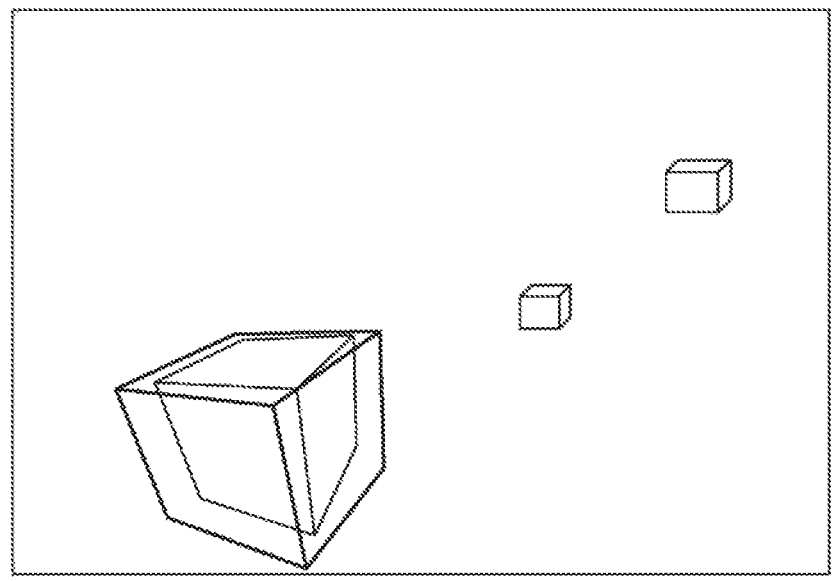
FIG. 21 is a diagram illustrating the superposition state in the case of the first example described in conjunction with FIG. 17.

FIG. 21 is a diagram illustrating the superposition state in the case of the first example described in conjunction with FIG. 17. In this example, as is known from FIG. 21, the camera image and the CG image are deviated, so that the superposition accuracy of the camera image and the CG image is not good. Since the determination value fitness that determines the quality of the superposition state of the camera image and the CG image is less than the reference value Ref2, step S708 is not executed, and thereby, determination value fitness that determines the quality of the superposition state is not incremented.

Figure 22:
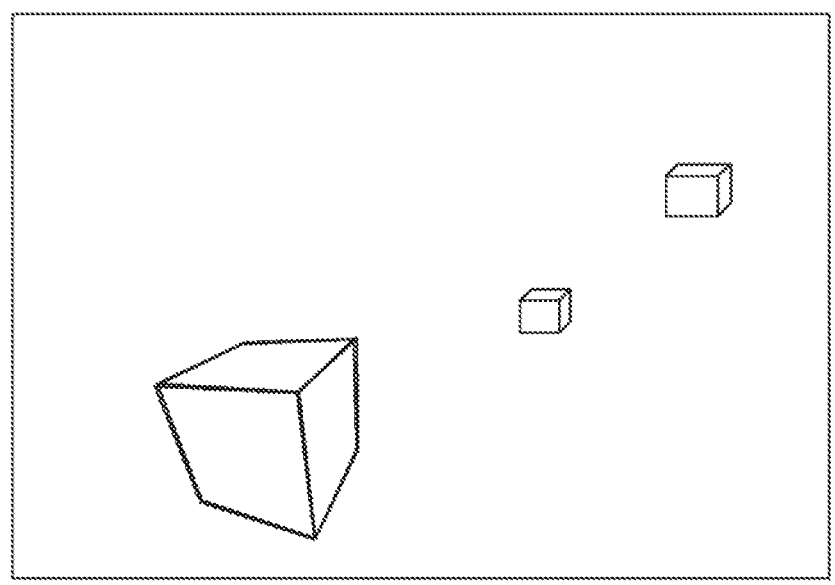
FIG. 22 is a diagram illustrating the superposition state in the case of the second example described in conjunction with FIG. 18.

FIG. 22 is a diagram illustrating the superposition state in the case of the second example described in conjunction with FIG. 18. In this example, as is known from FIG. 22, there is almost no deviation between the camera image and the CG image, and the accuracy of the superposition of the camera image and the CG image is good. Since the determination value fitness that determines the quality of the superposition state of the camera image and the CG image is equal to or higher than the reference value Ref2, step S708 is executed, and thereby, determination value fitness that determines the quality of the superposition state is incremented.

Returning to the explanation of FIG. 16, in step S710, the CPU 11 selects corresponding points of the camera image and the CG image based on the determination value fitness that determines the quality of the superposition state. For example, the calculation unit 43 selects, as corresponding points, feature point pairs with the determination value fitness that determines the quality of the superposition state is equal to or higher than a fixed value. Preferably, among the k number of selected feature point pairs, the top n (≤k) number of feature point pairs are selected with the accumulator value equal to or higher than a fixed value. In step S711, the CPU 11 estimates the final external parameter $E_2$ using the selected feature point pair, superimposes the captured image of the product 20 and the design data of the product 20 and displays them on the display screen of the display device 26 using the final external parameter $E_2$, and the process ends. For example, the calculation unit 43 estimates the final external parameter $E_2$ using the selected feature point pair (corresponding point), superimposes the captured image of the product 20 and the design data of the product 20 and displays them on the display screen of the display device 26 using the estimated final external parameter $E_2$, and the process ends, and thereby representing to the user.

Figure 23:
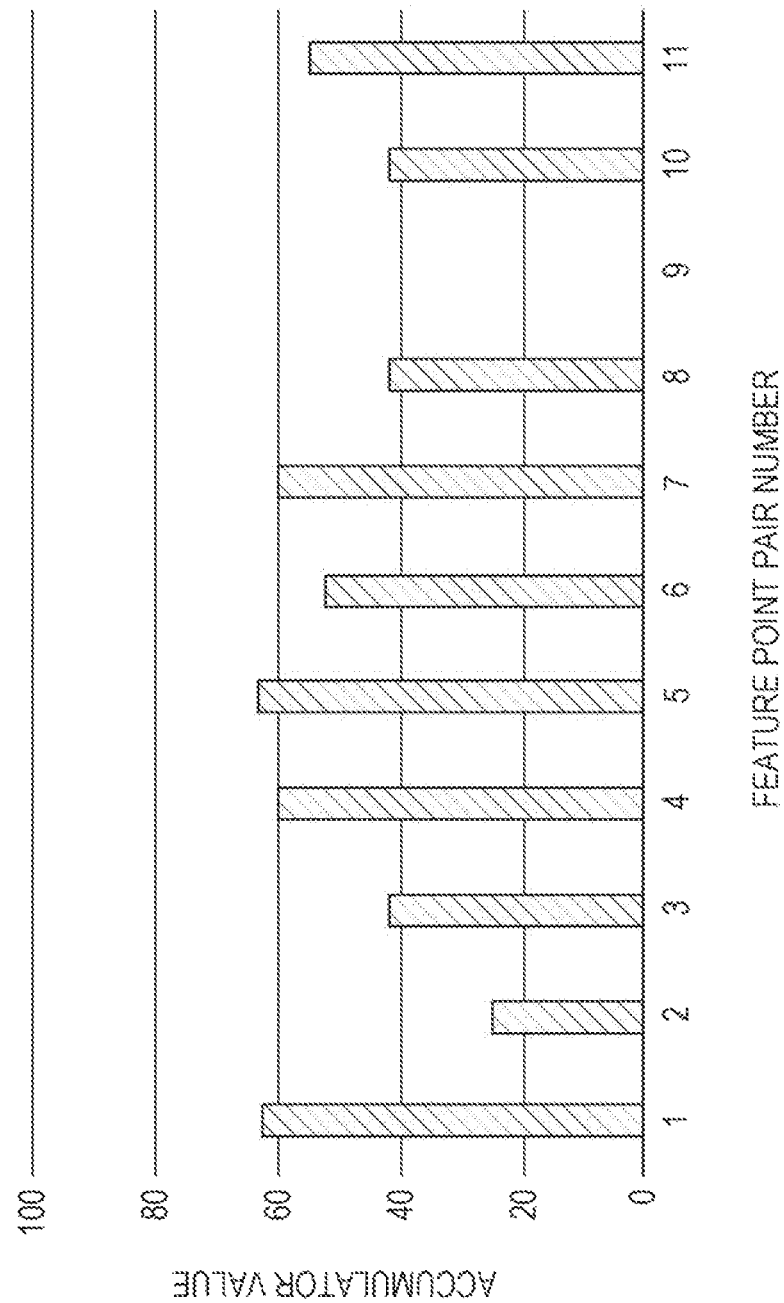
FIG. 23 is a graph for explaining an example of accumulator values linked to feature point pairs.

FIG. 23 is a graph for explaining an example of accumulator values linked to feature point pairs. In FIG. 23, the vertical axis indicates the accumulator value linked to the feature point pair in an arbitrary unit, and the horizontal axis indicates the feature point pair number attached to the feature point pair. FIG. 23 illustrates the case where the accumulator value linked with the feature point pair with the feature point pair numbers "2" and "9" is less than 30, which is an example of a fixed value. IN this case, the feature point pairs having the feature point pair numbers "2" and "9" may be excluded from the k number of selected feature point pairs. Among the feature point pair numbers "1", "3" to "8", "10", and "11" which are not excluded by the CPU 11, the top n=5 number of feature point pairs of the feature point pair number "1", "4", "5", "7", and "11" with accumulator value equal to or higher than a fixed value (=30) may be selected.

FIG. 24 is a table for explaining an example of the number of loops in the process of steps S702 to S709, the feature point pair selected in the step S702, the determination value fitness, and the accumulator value obtained for the feature point pair numbers 1 to 11. FIG. 24 illustrates an example in the case of the reference value Ref1=0.8 and the reference value Ref2=0.1 for convenience of explanation. In FIG. 24, the final accumulator value corresponds to the accumulator value in FIG. 23.

Figure 25:
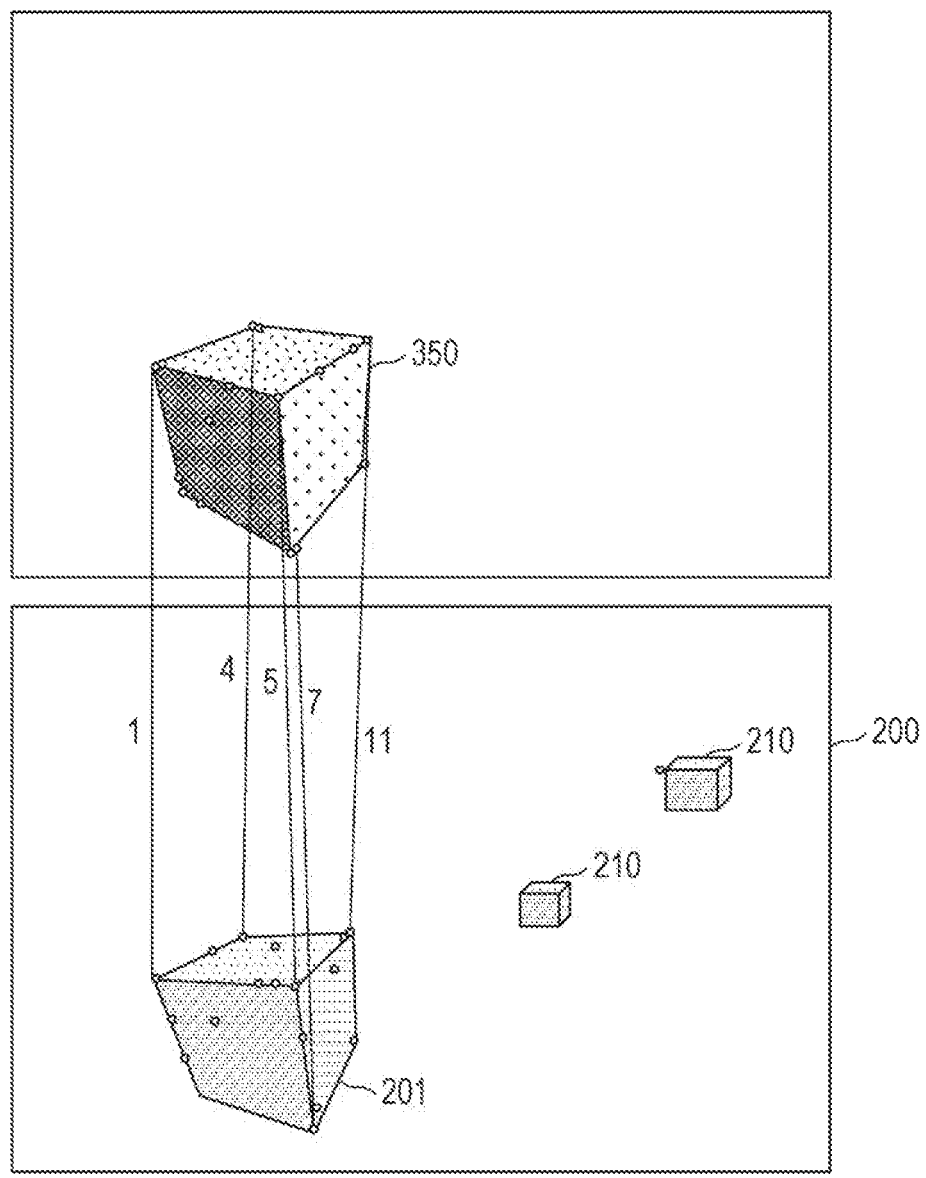
FIG. 25 is a diagram illustrating n=5 number of feature point pairs finally selected.

FIG. 25 is a diagram illustrating n=5 number of selected feature point pairs finally selected by excluding feature point pairs with the feature point pair numbers "2" and "9" from the k number of feature point pairs. In FIG. 25, the same parts as in FIG. 18 are indicated by the same reference numerals and the explanation thereof will be omitted. Although illustration is omitted, the feature point pairs of the CG image and the camera image may also be excluded or selected as in the case of FIG. 25.

In the first embodiment, the virtual image includes both a CG image and a normal image. However, as in the second embodiment, virtual image may include one of the CG image and the normal image. For example, in the second embodiment, the virtual image may include at least one of the CG image and the normal image. The virtual image may include a depth image.

In the each of the above-described embodiments, in response to the end of the adjustment on the GUI by the user (teaching related to general positional relationship between product design data and product captured image), the measurement apparatus may obtain an accurate superimposed image. It is not required to manually teach the feature (line or point) on the image to which part on the design drawing corresponds with accuracy. For this reason, it is possible to shorten the teaching time and to suppress the variation in the teaching due to the difference in the skill of the user. The measurement apparatus performs matching of local feature amounts in a state where a captured image of a measurement target captured by an image capturing device including an image sensor and a projective-transformed image of three-dimensional design data of the measurement target substantially overlap each other on a display screen to search the captured image and a virtual image generated from the projective-transformed image for a plurality of feature point pairs with similar local feature amounts of an image, estimates a temporary external parameter related to a position and orientation of the image capturing device with respect to the measurement target from a feature point pair randomly selected from the plurality of searched feature point pairs, compares an initial external parameter and the temporary external parameter to diagnose reliability of the temporary external parameter and to record a feature point pair used to calculate a temporary external parameter with the reliability equal to or higher than a given value among the recorded feature point pairs, and selects, among the feature point pairs, a specified number of feature point pairs with a score value indicating similarity between two feature points forming each feature point pair equal to or higher than a threshold value, estimate a final external parameter using the selected feature point pair, and display the captured image and the projective-transformed image in a superimposing manner using the final external parameter.

According to each of the above-described embodiments, it is possible to improve the superposition accuracy when superimposing and drawing design data of a product on the captured image of the product.

As described above, although the disclosed measurement apparatus, measurement method, and measurement program have been described by embodiments, the present disclosure is not limited to the above embodiments, and it goes without saying that various modifications and improvements are possible within the scope of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A measurement apparatus comprising:
a memory; and
a processor coupled to the memory and the processor that
matches local feature amounts between an image of a measurement target captured by an image sensor and a projective-transformed image of three-dimensional design data of the measurement target in a state where the images overlap each other on a display screen to search the captured image and a virtual image generated from the projective-transformed image for a plurality of feature point pairs with similar local feature amounts of the images;
estimates a temporary external parameter related to a position and orientation of the image sensor with respect to the measurement target from a feature point pair randomly selected from the plurality of searched feature point pairs having feature points within a given distance of each other;
compares an initial external parameter and the temporary external parameter to diagnose reliability of the temporary external parameter and to record a feature point pair used to calculate a temporary external parameter with the reliability equal to or higher than a given value; and
selects, among the feature point pairs, a specified number of feature point pairs with a score value indicating similarity between two feature points forming each feature point pair equal to or higher than a threshold value, estimates an external parameter using the selected feature point pairs, and displays the captured image and the projective-transformed image in a superimposing manner using the external parameter.

2. The measurement apparatus according to claim 1, wherein the processor is configured to:
generate, by simulation, a virtual image including a plurality of computer graphic images of each of which a defocus amount is changed and a normal image using the initial external parameter in the state where the captured image and the projective-transformed image overlap each other on the display screen; and
match local feature amounts to search the captured image and each virtual image for a plurality of the feature point pairs with similar local feature amounts in the image.

3. The measurement apparatus according to claim 2, wherein the processor is configured to generate, by simulation, a plurality of virtual images including a plurality of computer graphic images in which illumination and defocus amount are changed and a plurality of normal images in which the defocus amount is changed using the initial external parameter in a state where the captured image and the projective-transformed image substantially overlap each other on the display screen.

4. The measurement apparatus according to claim 1, wherein the processor is configured to display the captured image and the projective-transformed image on the display screen in a superimposing manner using a plurality of feature point pairs which satisfy at least one given condition between a given condition regarding an inter-coordinate distance obtained from randomly selected feature point pairs among the plurality of searched feature point pairs and a given condition regarding a line-of-sight direction and a position.

5. The measurement apparatus according to claim 1, wherein, when a distance between a feature point of the captured image displayed on the display screen and a corresponding feature point of the virtual image is equal to or greater than a given distance, the processor is configured to exclude the feature point from the plurality of searched feature point pairs before calculating the temporary external parameter using the plurality of searched feature point pairs.

6. The measurement apparatus according to claim 1, wherein, when a line-of-sight direction and position of the image sensor obtained from external parameters estimated by the feature points of the virtual image and the feature points of the captured image and a line-of-sight direction and position of the image sensor obtained from the initial external parameter deviate from each other by an extent equal to or larger than a fixed amount, the processor is configured not to record the feature point as a reliable feature point pair.

7. The measurement apparatus according to claim 1, wherein the processor is configured to:
select the specified number of feature point pairs with the score value equal to or higher than the threshold value; and
evaluate a state where the captured image and the virtual image are superimposed by an evaluation value evaluated from a superposition state of edges of the captured image and the virtual image and calculate the external parameter using a feature point pair with the evaluation value equal to or higher than a fixed value among the specified number of selected feature point pairs.

8. A measurement method executed by a computer, comprising:
matching local feature amounts between an image of a measurement target captured by an image sensor and a projective-transformed image of three-dimensional design data of the measurement target in a state where the images overlap each other on a display screen to search the captured image and a virtual image generated from the projective-transformed image for a plurality of feature point pairs with similar local feature amounts of the images;
estimating a temporary external parameter related to a position and orientation of the image sensor with respect to the measurement target from a feature point pair randomly selected from the plurality of searched feature point pairs having feature points within a given distance of each other;
comparing an initial external parameter and the temporary external parameter to diagnose reliability of the temporary external parameter and to record a feature point pair used to calculate a temporary external parameter with the reliability equal to or higher than a given value; and selecting, among the feature point pairs, a specified number of feature point pairs with a score value indicating similarity between two feature points forming each feature point pair equal to or higher than a threshold value, estimating an external parameter using the selected feature point pairs, and displaying the captured image and the projective-transformed image in a superimposing manner using the external parameter.

9. The measurement method according to claim 8, wherein the matching further comprising:
generating, by simulation, a virtual image including a plurality of computer graphic images of each of which a defocus amount is changed and a normal image using the initial external parameter in the state where the captured image and the projective-transformed image overlap each other on the display screen; and
matching local feature amounts to search the captured image and each virtual image for a plurality of the feature point pairs with similar local feature amounts in the image.

10. The measurement method according to claim 9, wherein the generating includes generating, by simulation, a plurality of virtual images including a plurality of computer graphic images in which illumination and defocus amount are changed and a plurality of normal images in which the defocus amount is changed using the initial external parameter in a state where the captured image and the projective-transformed image substantially overlap each other on the display screen.

11. The measurement method according to claim 8, wherein the displaying includes displaying the captured image and the projective-transformed image on the display screen in a superimposing manner using a plurality of feature point pairs which satisfy at least one given condition between a given condition regarding an inter-coordinate distance obtained from randomly selected feature point pairs among the plurality of searched feature point pairs and a given condition regarding a line-of-sight direction and a position.

12. The measurement method according to claim 8, wherein the comparing includes when a line-of-sight direction and position of the image sensor obtained from external parameters estimated by the feature points of the virtual image and the feature points of the captured image and a line-of-sight direction and position of the image sensor obtained from the initial external parameter deviate from each other by an extent equal to or larger than a fixed amount, doing not to record the feature point as a reliable feature point pair.

13. The measurement method according to claim 8, wherein the estimating includes when a distance between a feature point of the captured image displayed on the display screen and a corresponding feature point of the virtual image is equal to or greater than a given distance, excluding the feature point from the plurality of searched feature point pairs before calculating the temporary external parameter using the plurality of searched feature point pairs.

14. A non-transitory computer-readable recording medium storing therein a program for causing a computer to execute a process, the process comprising:
matching local feature amounts between an image of a measurement target captured by an image sensor and a projective-transformed image of three-dimensional design data of the measurement target in a state where the images overlap each other on a display screen to search the captured image and a virtual image generated from the projective-transformed image for a plurality of feature point pairs with similar local feature amounts of the images;
estimating a temporary external parameter related to a position and orientation of the image sensor with respect to the measurement target from a feature point pair randomly selected from the plurality of searched feature point pairs having feature points within a given distance of each other;
comparing an initial external parameter and the temporary external parameter to diagnose reliability of the temporary external parameter and to record a feature point pair used to calculate a temporary external parameter with the reliability equal to or higher than a given value; and
selecting, among the feature point pairs, a specified number of feature point pairs with a score value indicating similarity between two feature points forming each feature point pair equal to or higher than a threshold value, estimating an external parameter using the selected feature point pairs, and displaying the captured image and the projective-transformed image in a superimposing manner using the external parameter.

15. The non-transitory computer-readable recording medium according to claim 14,
wherein the matching further comprising:
generating, by simulation, a virtual image including a plurality of computer graphic images of each of which a defocus amount is changed and a normal image using the initial external parameter in the state where the captured image and the projective-transformed image overlap each other on the display screen; and
matching local feature amounts to search the captured image and each virtual image for a plurality of the feature point pairs with similar local feature amounts in the image.

16. The non-transitory computer-readable recording medium according to claim 15,
wherein the generating includes generating, by simulation, a plurality of virtual images including a plurality of computer graphic images in which illumination and defocus amount are changed and a plurality of normal images in which the defocus amount is changed using the initial external parameter in a state where the captured image and the projective-transformed image substantially overlap each other on the display screen.

17. The non-transitory computer-readable recording medium according to claim 14,
wherein the displaying includes displaying the captured image and the projective-transformed image on the display screen in a superimposing manner using a plurality of feature point pairs which satisfy at least one given condition between a given condition regarding an inter-coordinate distance obtained from randomly selected feature point pairs among the plurality of searched feature point pairs and a given condition regarding a line-of-sight direction and a position.

18. The non-transitory computer-readable recording medium according to claim 14,
wherein the comparing includes when a line-of-sight direction and position of the image sensor obtained from external parameters estimated by the feature points of the virtual image and the feature points of the captured image and a line-of-sight direction and position of the image sensor obtained from the initial external parameter deviate from each other by an extent equal to or larger than a fixed amount, doing not to record the feature point as a reliable feature point pair.

19. The non-transitory computer-readable recording medium according to claim 14,
wherein the estimating includes when a distance between a feature point of the captured image displayed on the display screen and a corresponding feature point of the virtual image is equal to or greater than a given distance, excluding the feature point from the plurality of searched feature point pairs before calculating the temporary external parameter using the plurality of searched feature point pairs.

20. The non-transitory computer-readable recording medium according to claim 17,
wherein the displaying includes:
selecting the specified number of feature point pairs with the score value equal to or higher than the threshold value; and
evaluating a state where the captured image and the virtual image are superimposed by an evaluation value evaluated from a superposition state of edges of the captured image and the virtual image and calculate the external parameter using a feature point pair with the evaluation value equal to or higher than a fixed value among the specified number of selected feature point pairs.

* * * * *